US010783863B2

(12) United States Patent
Jeffrey et al.

(10) Patent No.: US 10,783,863 B2
(45) Date of Patent: *Sep. 22, 2020

(54) MACHINE-CONTROL OF A DEVICE BASED ON MACHINE-DETECTED TRANSITIONS

(71) Applicant: Gracenote, Inc., Emeryville, CA (US)

(72) Inventors: Michael Jeffrey, Moraga, CA (US); Markus K. Cremer, Orinda, CA (US); Dong-In Lee, Emeryville, CA (US)

(73) Assignee: Gracenote, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/192,648

(22) Filed: Nov. 15, 2018

(65) Prior Publication Data

US 2019/0156799 A1 May 23, 2019

Related U.S. Application Data

(63) Continuation of application No. 14/849,370, filed on Sep. 9, 2015, now Pat. No. 10,134,373, which is a (Continued)

(51) Int. Cl.
*G10H 1/00* (2006.01)
*H04N 21/414* (2011.01)
(Continued)

(52) U.S. Cl.
CPC ...... *G10H 1/0008* (2013.01); *H04M 1/72569* (2013.01); *H04N 21/41407* (2013.01);
(Continued)

(58) Field of Classification Search
CPC ............ G10H 1/0008; H04M 1/72569; H04N 21/41407; H04N 21/41422
See application file for complete search history.

(56) References Cited

U.S. PATENT DOCUMENTS 5,712,953 A 1/1998 Langs
5,918,223 A 6/1999 Blum et al.
(Continued)

FOREIGN PATENT DOCUMENTS

AU 2012216513 9/2012
EP 2264988 12/2010
(Continued)

OTHER PUBLICATIONS

European Patent Office, "Communication Pursuant to Article 94(3) EPC," issued in connection with European Application Serial No. 12174527.7, dated Nov. 29, 2016, 4 pages.
(Continued)

*Primary Examiner* — El Hadji M Sall
(74) *Attorney, Agent, or Firm* — Hanley, Flight & Zimmerman, LLC

(57) ABSTRACT

Apparatus, methods, and systems that operate to provide interactive streaming content identification and processing are disclosed. An example apparatus includes a classifier to determine an audio characteristic value representative of an characteristic; a transition detector to detect a transition between a music category and a talk category by comparing the audio characteristic value to a threshold value among a set of threshold values, the set of threshold values corresponding to the music category and the talk category; and a context manager to control a device to initiate extraction of fingerprints, responsive to the detected transition between the music category and the talk category.

20 Claims, 14 Drawing Sheets

Related U.S. Application Data continuation of application No. 13/287,871, filed on Nov. 2, 2011, now Pat. No. 9,160,837.

(60) Provisional application No. 61/502,799, filed on Jun. 29, 2011.

(51) Int. Cl.
| | | |
|---|---|---|
| *H04N 21/422* | (2011.01) | |
| *H04N 21/439* | (2011.01) | |
| *H04N 21/44* | (2011.01) | |
| *H04M 1/725* | (2006.01) | |
| *H04L 29/06* | (2006.01) | |

(52) U.S. Cl.
CPC . *H04N 21/41422* (2013.01); *H04N 21/42203* (2013.01); *H04N 21/4394* (2013.01); *H04N 21/4398* (2013.01); *H04N 21/44008* (2013.01); *G10H 2210/066* (2013.01); *G10H 2210/071* (2013.01); *H04L 65/4084* (2013.01)

(56) References Cited

U.S. PATENT DOCUMENTS

| | | | |
|---|---|---|---|
| 6,240,459 | B1 | 5/2001 | Roberts et al. |
| 6,678,215 | B1 | 1/2004 | Treyz et al. |
| 6,941,275 | B1 | 9/2005 | Swierczek |
| 6,995,309 | B2 | 2/2006 | Samadani et al. |
| 6,999,923 | B1 | 2/2006 | Ablondi et al. |
| 7,193,148 | B2 | 3/2007 | Cremer et al. |
| 8,195,451 | B2 | 6/2012 | Toguri |
| 8,457,972 | B2 | 6/2013 | Topchy et al. |
| 8,789,084 | B2 | 7/2014 | Glitsch et al. |
| 9,106,952 | B2 | 8/2015 | McMillan |
| 9,160,837 | B2 | 10/2015 | Jeffrey et al. |
| 9,195,649 | B2 | 11/2015 | Neuhauser et al. |
| 9,210,208 | B2 | 12/2015 | Ramaswamy et al. |
| 9,378,719 | B2 | 6/2016 | Sasai et al. |
| 2002/0005110 | A1 | 1/2002 | Pachet et al. |
| 2003/0236663 | A1 | 12/2003 | Dimitrova et al. |
| 2004/0030550 | A1 | 2/2004 | Liu et al. |
| 2004/0201784 | A9 | 10/2004 | Dagtas et al. |
| 2004/0267525 | A1 | 12/2004 | Lee et al. |
| 2005/0091066 | A1 | 4/2005 | Singhal |
| 2005/0120368 | A1 | 6/2005 | Goronzy et al. |
| 2005/0131688 | A1 | 6/2005 | Goronzy et al. |
| 2005/0177362 | A1 | 8/2005 | Toguri |
| 2005/0190087 | A1* | 9/2005 | Yamada ............ G11B 20/10009 341/139 |
| 2007/0032259 | A1 | 2/2007 | Gounaris |
| 2007/0049788 | A1 | 3/2007 | Kalinowski et al. |
| 2007/0124756 | A1 | 5/2007 | Covell et al. |
| 2008/0048908 | A1 | 2/2008 | Sato |
| 2009/0060211 | A1 | 3/2009 | Sakurai et al. |
| 2009/0287327 | A1 | 11/2009 | Hsu et al. |
| 2010/0198583 | A1 | 8/2010 | Su et al. |
| 2010/0332237 | A1* | 12/2010 | Takeuchi ................ G10L 25/78 704/278 |
| 2011/0098056 | A1 | 4/2011 | Rhoads et al. |
| 2011/0145868 | A1 | 6/2011 | Hultkrantz |
| 2012/0239401 | A1 | 9/2012 | Arakawa |
| 2013/0007201 | A1 | 1/2013 | Jeffrey et al. |
| 2014/0032537 | A1 | 1/2014 | Shekhawat |
| 2014/0249824 | A1 | 9/2014 | MacAuslan |
| 2014/0336797 | A1 | 11/2014 | Emerson, III |
| 2015/0220633 | A1 | 8/2015 | Fuzell-Casey et al. |

FOREIGN PATENT DOCUMENTS

| | | |
|---|---|---|
| JP | 6194098 | 5/1986 |
| JP | 2002116784 | 4/2002 |
| JP | 2003219061 | 7/2003 |
| JP | 2005321660 | 11/2005 |
| JP | 2008079047 | 4/2008 |
| JP | 2009069425 | 4/2009 |
| JP | 2013013092 | 1/2013 |
| WO | 2008126347 | 10/2008 |
| WO | 2008137756 | 11/2008 |
| WO | 2011044848 | 4/2011 |
| WO | 2011070972 | 6/2011 |

OTHER PUBLICATIONS

Japanese Patent Office, "Examiner's Decision of Final Refusal," issued in connection with Japanese Application Serial No. 2012-159985, includes English translation, dated Nov. 26, 2015, 7 pages.

United States Patent and Trademark Office, "Final Office Action," issued in connection with U.S. Appl. No. 13/287,871, dated Jan. 16, 2015, 19 pages.

United States Patent and Trademark Office, "Non-Final Office Action," issued in connection with U.S. Appl. No. 13/287,871, dated Apr. 24, 2014, 14 pages.

United States Patent and Trademark Office, "Notice of Allowance," issued in connection with U.S. Appl. No. 13/287,871, dated Jul. 14, 2015, 7 pages.

European Patent Office, "Extended European Search Report," issued in connection with European Application Serial No. 12174527.7, dated Mar. 20, 2013, 6 pages. (Document not provided.).

Japanese Patent Office, "Office Action," issued in connection with Japanese Application Serial No. 2012-159985, includes English translation of claims, dated Feb. 24, 2014, 13 pages. (Document not provided.).

Japanese Patent Office, "Office Action," issued in connection with Japanese Application Serial No. 2012-159985, dated Dec. 1, 2014, 3 pages. (Document not provided.).

Flannick, "Rhythm Detection in Recorded Music," Saint Joseph's University, Department of Mathematics and Computer Science, Jul. 8, 2003, 43 pages.

Gainza, "Automatic Musical Meter Detection," Dublin Institute of Technology, IEEE International Conference on Acoustics, Speech and Signal Processing (ICASSP), Taipei, Taiwan, Jan. 1, 2009, 5 pages.

Sukittanon et al., "Modulation Scale Analysis for Content Identification," University of Washington, Department of Electrical Engineering, Nov. 1, 2003, 12 pages.

Saunders, "Real-Time Discrimination of Broadcast Speech/Music," Sanders, A Lockheed Martin Co., IEEE, 1996, 4 pages.

United States Patent and Trademark Office, "Non-Final Office Action," issued in connection with U.S. Appl. No. 14/849,370, dated Feb. 12, 2018, 14 pages.

United States Patent and Trademark Office, "Notice of Allowance," issued in connection with U.S. Appl. No. 14/849,370, dated Jul. 17, 2018, 7 pages.

European Patent Office, "Communication under Rule 71(3) EPC," mailed in connection with European Patent Application No. 12174527.7 dated May 8, 2019, 72 pages.

European Patent Office, "European Search Report," issued in connection with European Patent Application No. 19195906.3 dated Nov. 26, 2019, 10 pages.

\* cited by examiner

MACHINE-CONTROL OF A DEVICE BASED ON MACHINE-DETECTED TRANSITIONS

RELATED APPLICATIONS

This patent arises from a continuation of U.S. patent application Ser. No. 14/849,370, entitled "MACHINE-CONTROL OF A DEVICE BASED ON MACHINE-DETECTED TRANSITIONS," filed on Sep. 9, 2015, which is a continuation of U.S. patent application Ser. No. 13/287,871, entitled "INTERACTIVE STREAMING CONTENT APPARATUS, SYSTEMS AND METHODS," filed on Nov. 2, 2011, which claims priority to U.S. Provisional Patent Application No. 61/502,799, entitled "INTERACTIVE STREAMING CONTENT IDENTIFICATION," filed on Jun. 29, 2011. Priority to U.S. patent application Ser. No. 14/849,370, U.S. patent application Ser. No. 13/287,871, and U.S. Provisional Patent Application No. 61/502,799 is claimed. U.S. patent application Ser. No. 14/849,370, U.S. patent application Ser. No. 13/287,871, and U.S. Provisional Patent Application No. 61/502,799 are incorporated herein by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011, Gracenote, Inc. All Rights Reserved.

BACKGROUND

Various types of streaming content, such as that provided by the entertainment and communications media, exist for consumption by portable and fixed electronic devices, including cellular telephones, TV's, and tablets. The content may comprise audio and/or video streams provided by television (TV), radio, and the Internet, among others. However, the infrastructure established to support sharing the experience of this media has been somewhat limited, due to constraints imposed by network bandwidth, device processing power, and device battery discharge rates.

BRIEF DESCRIPTION OF THE DRAWINGS

Some embodiments are illustrated by way of example and not limitation in the figures of the accompanying drawings in which.

DETAILED DESCRIPTION

Example methods and systems for streaming content identification and processing to provide an interactive experience are discussed herein. In the following description, for purposes of explanation, numerous specific details are set forth in order to provide a thorough understanding of example embodiments. It will be evident, however, to one skilled in the art that the present subject matter may be practiced without these specific details. It will also be evident that the types of media content described herein are not limited to the examples provided and may include other scenarios not specifically discussed.

INTRODUCTION

The Interactive Streaming Identification and Processing System described herein enables content creators to easily and dynamically link data in multi-billion dollar markets via audio and video signal recognition. TV shows, gaming, social networks and rating systems, as well as national, regional, and local advertising can be linked together, based upon the recognition of audio signal content, and transitions in that content.

Interactive TV, film, radio, and other media services can be enabled in this manner. The Interactive Streaming Identification and Processing System can thus create a compelling interactive TV/Film/Gaming experience by relating audio-video on a screen with other rich content, with categorization of the audio and video, and links to other content/sites. The mechanism described herein can be easily migrated to social networks, allowing any source of audio/video (A/V) to power interactivity.

Considering as a general example, a simple N-screen application (an application running on the 'second screen' of a separate device, e.g. a tablet, that provides information to supplement content enjoyed on the 'first screen' of a central or main device, e.g. a TV set) that works everywhere on any portable electronic device. The N-screen application can be used to link what's heard/seen by the user with another device, synchronizing relevant high-quality meta content. This can improve the ROI (return on investment) for TV stations, power real-time interactivity for content on another or the same device, as well as providing a platform to respond to content (e.g., commercials, programs, games, and other sources). This enables knowledge of where the content is located, while maintaining a temporal location within the content for which interaction is desired.

Figure 1:
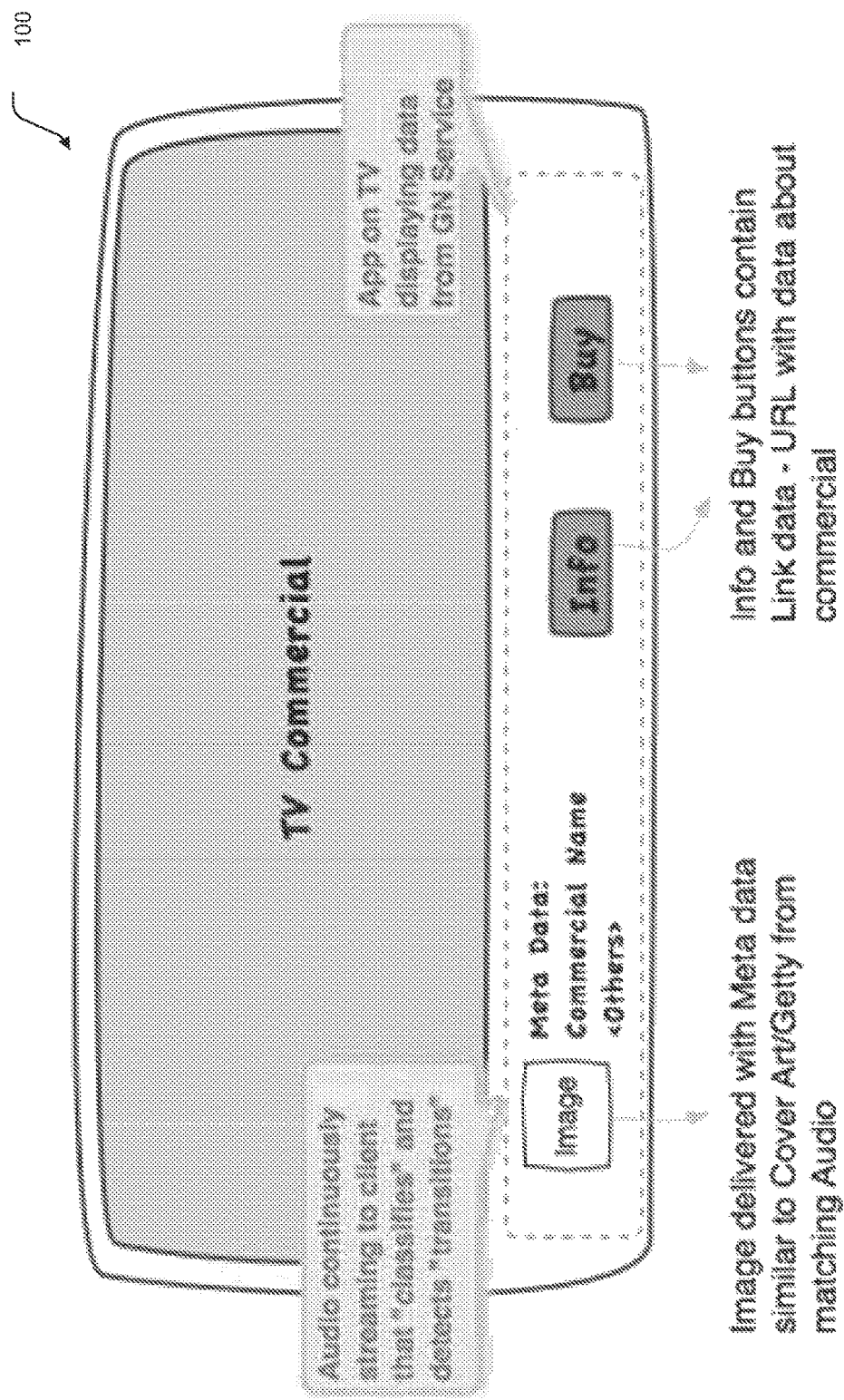
FIG. 1 illustrates operation in conjunction with a television commercial, according to various embodiments of the invention.

FIG. 1 illustrates operation in conjunction with a TV commercial 100, according to various embodiments of the invention. This type of operation uses technology from a connected client classification engine (described below) to identify transitions in an audio signal, and a contextual rules engine (also described below) optimizes the response to transitions to improve interactivity, while reducing load on the GN Service ("GN" or the "GN Service" is a generic term used in this document to represent streaming media recognition services, similar to or identical to those provided by the Gracenote® Network, such as fingerprinting and/or data retrieval associated with audio and/or video content).

In most embodiments, content is continuously synchronized with audio and/or video, such as the TV commercial 100 illustrated in FIG. 1. Various embodiments leverage existing Track-Submit (i.e. submission of data related to a content item by third parties or consumers and/or reception of an indication that certain data is related to content), Content Metadata Ingestion, Content Matching Services (CMS—Services that allow delivery of rich metadata such as e.g. cover art for a related content item, or an identifier to link into a third party store), GN Service, and Web Application Interfaces (API's) allowing a TV with standard connections and "widget apps" (application programs running on a consumer device like e.g. a TV set) to provide highly interactive applications and content that automatically identify, synchronize, and deliver information, while reducing the consumption of memory, battery, processor, and network resources that might otherwise occur.

Figure 2:
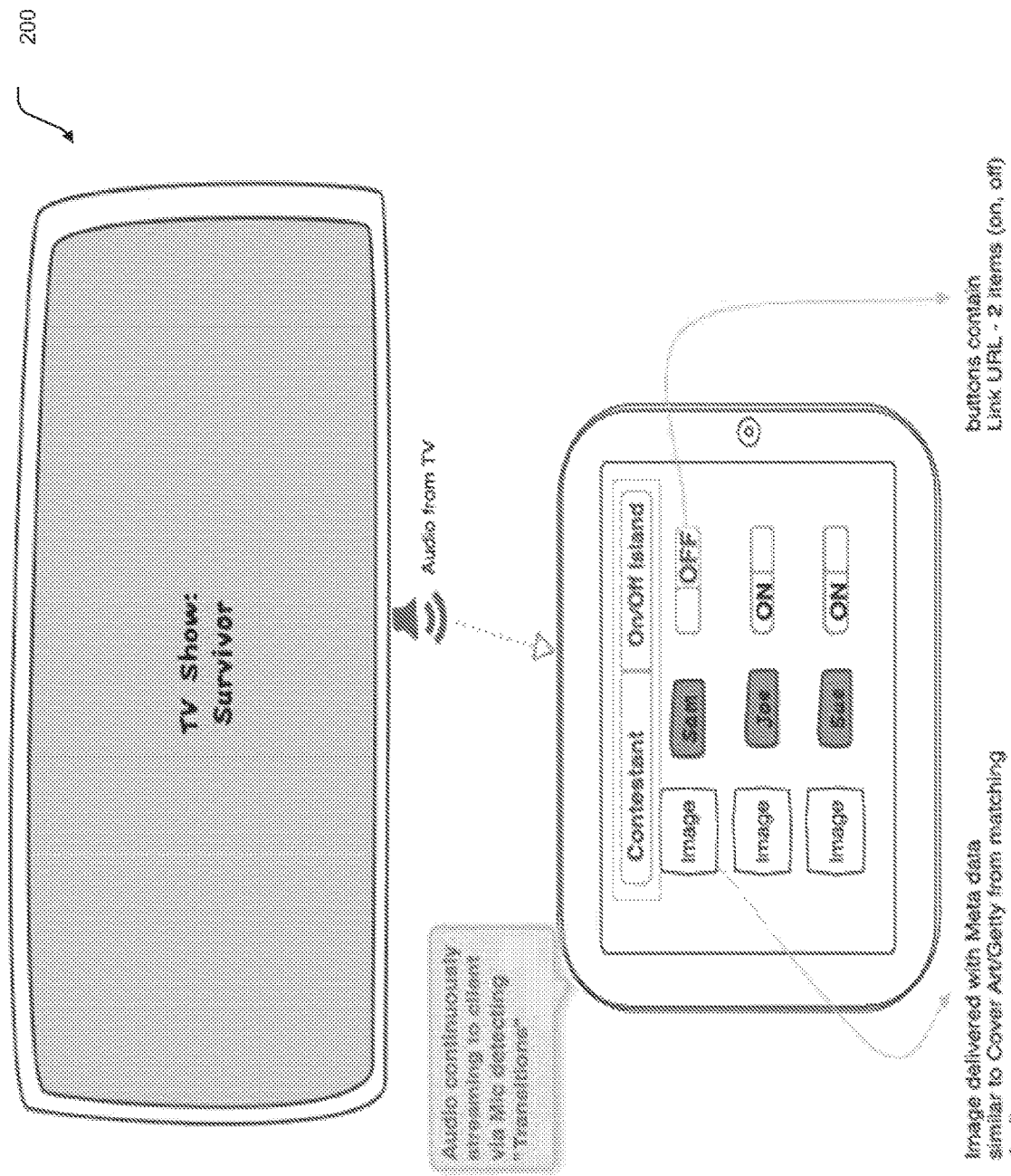
FIG. 2 illustrates operation in conjunction with a television show, according to various embodiments of the invention.

FIG. 2 illustrates operation in conjunction with a TV show 200, according to various embodiments of the invention. This operation increases interactivity for shows—it can be used for voting, exploration, etc. There is the potential to build applications rapidly for shows, using technology from connected client classifications to detect transitions in an audio signal. Audio and/or video fingerprinting allows recognition, including time synchronization, of the content provided by the TV show 200 illustrated in FIG. 2.

Figure 3:
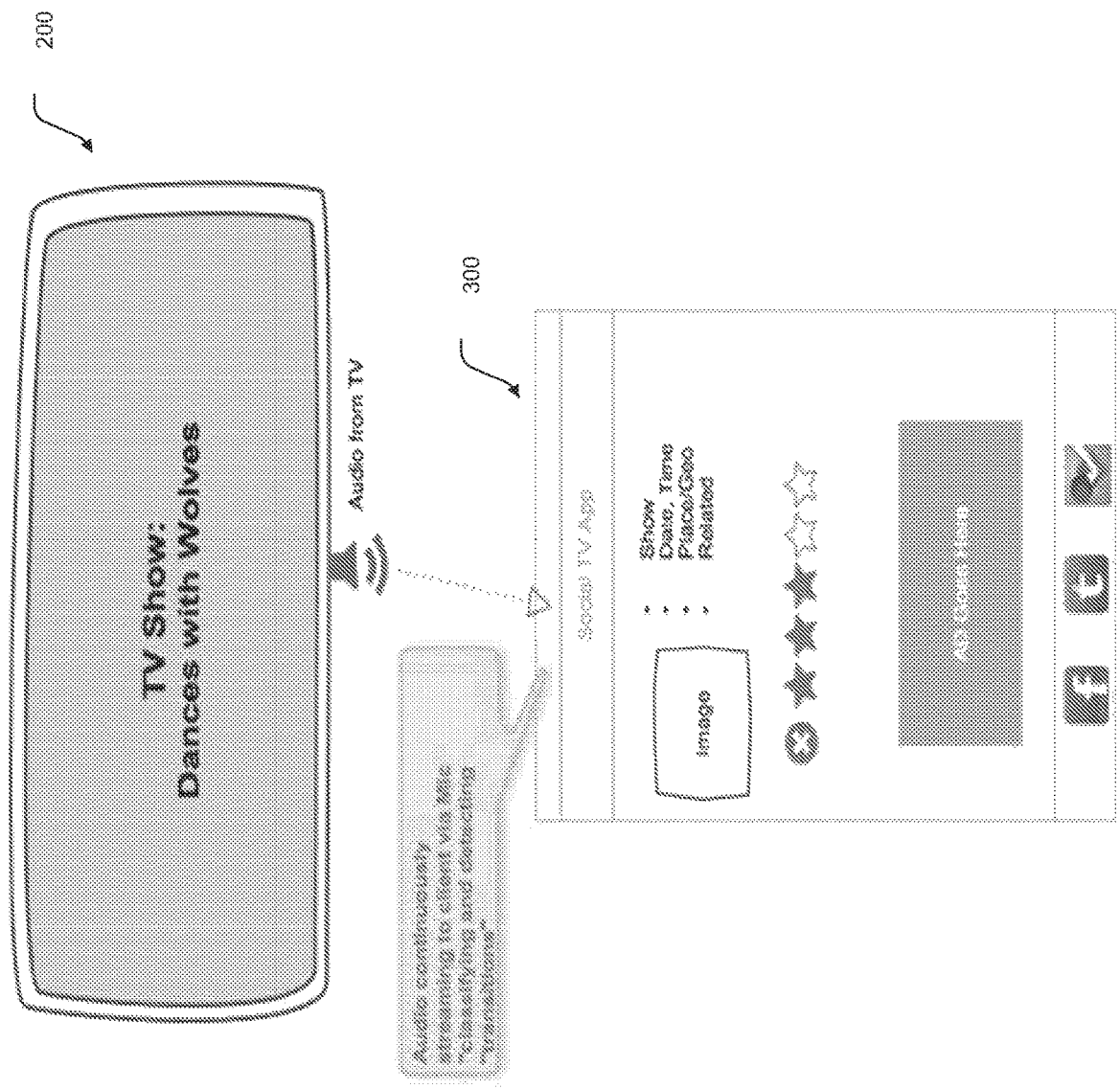
FIG. 3 illustrates operation in conjunction with a television show and a social network, according to various embodiments of the invention.

FIG. 3 illustrates operation in conjunction with a TV show 200 and a social network application 300, according to various embodiments of the invention. This operation enables social network interaction—a user can indicate what they are watching without typing or otherwise consciously acting to provide information while earning benefits. A contextual rules engine (described below) allows optimizing for classifications and transitions by utilizing local and network/remote recognition engines.

Various components may be included in many embodiments. As shown in Table I, these components include, but are not limited to:

TABLE I

| Component | Purpose |
| --- | --- |
| MSA Submit | Media Submit Application - metadata ingestion & fingerprinting. Can use contextual classification and transitions to separate commercials from broadcast content. |
| CMS | Content Matching Services - Matching content, linking, images, and fpx (flashpix bitmap) syndication. |
| Classifier | Technology associated with software, hardware or a combination of the two that uses signal derived characteristics, or features, to identify "transitions" in the media stream. |
| Streaming client | Intelligently enable identification of a continuous content stream (e.g. audio content coded in, for example, PCM or pulse code modulation format, and/or received via, for example, a microphone input, referred to as MIC going forward). |
| GN Service | Network Service Platform that allows storage, identification and retrieval of real-time and non-real-time fingerprints, and associated metadata such as media title, art work, actor information etc. |

System Description

The techniques described herein are suitable for delivering a frictionless always-available interactive multiscreen experience that works with any device and anywhere encourages mass-market adoption. "Frictionless" means that interactive content is delivered to a connected device of choice without pressing multiple buttons or proactively conducting complex operations such as e.g. an Internet search, from the consumer's perspective. To support the use of an "N-screen" content experience, which for the purposes of this document means that at least some aspects of the content (e.g., portions of the content itself, or metadata associated with the content) rendered by N devices is transparently synchronized among all of the devices, a system operates to recognize content on one device as it is rendered on another device (or in another application running on the same device) while conserving resources on battery powered devices, where the entire system comprises Internet connected devices and online servers.

To support interactivity with any device and anywhere, the second (or, in case of multiple devices, the N-th) device should be able to recognize audio signal content without a physical connection to the rendering device or content source—though it is coupled to the network no means or protocols exist for the content source or rendering device to exchange data about the content with said second device. Further, connected devices such as mobile phones and tablets have limited battery, processing power, and network bandwidth that should be conserved, while at the same time serving the end-consumer's desire of providing a constant flow of highly-interactive or informative content. This leads to the need for a system with the following unique capabilities:

Conservation of device resources—CPU or processing power, battery drainage, network bandwidth, and memory capacity.

Economically supporting millions of devices—that continually recognize and/or synchronize content with a limited number of server instances.

Personalized interaction—delivering preferred interactive content without cumbersome and overburdening tasks for an end-user, such as using text searching on the internet to find information that is related to a specific movie scene without the need for user interaction.

Enabling an interactive N-Screen experience—that works anywhere with any device; for example, using the same mobile device to interact with different TV sets (not necessarily at the same time). Interactive N-Screen can also be within the same connected device (a connected TV for example, where content could be delivered to the TV set from a set-top box, but where no direct communication channel is provided to inform the application on the TV set with metadata about this content.)

Automatic content synchronization—the correct interactive content is presented at the right time without the end-user doing anything proactively or reactively.

A personalized history of transitions detected and content items identified—is available to the end-user.

Timely delivery of transition events—to applications to drive highly interactive applications (the application is e.g. reacting to applause or laughter occurring in a sit-com TV show in a certain way, for example by displaying fireworks or flickering with the screen).

Challenges to be Addressed

Device resource conservation—Continually recognizing audio on connected devices using conventional approaches consumes significant processor, network, and memory resources, resulting in a more limited battery life for devices.

Processor—signal processing can require significant amounts of processor use, which limits other resources available to applications and can significantly increase consumption of available battery power.

Memory—processing large amounts of data in memory near real-time can require large amounts of memory that at times may not be available.

Network—continually transmitting and receiving data consumes large amounts of battery power, significantly reducing the useful device portability life. Additionally, usage charges may factor into the viability of a product offering.

Battery—portable devices have a limited battery life that should be balanced against any capability that runs for extended periods of time (hours at a time).

Millions of concurrent devices create a bottleneck at the server they are connecting to. This includes both the Gracenote Service and the network provider networks (network providers are increasingly asking that applications, particularly applications streaming content, be designed to conserve network resources). Being conscious about bandwidth consumption will also be appreciated by the consumer, as it conserves this resource, but also brings down latency of the application and thereby improves the usage experience of the application.

Personalized Interaction, for automatically delivering the desired interactive content based on context (explicit and implicit), language, location (e.g., country and region), and commercial content in response to a recognition.

An interactive N-screen application to facilitate an interactive consumer experience that works anywhere with any device that a specific consumer owns (with or without user identification) is desirable.

Currently, to enable multiple devices to interact, a complex multi-channel communication system is used, with the end-user participating via an individual account. This complexity can raise costs and slow adoption while limiting the consumer's ability to gain interactivity with any connected device at any time.

Device Linking—Various embodiments allow data and personalization to be shared between devices anonymously, without creating accounts. This results in loosely coupling (via audio or video) interactivity between devices. This also promotes the ability to interact with the history on any of the devices in a personalized way, which opens up many social and merchandising possibilities.

Device optimization—Audio and video are processed to improve recognition with varying device capabilities. Dynamically adjusting the signal based on environmental and contextual feedback drives interactivity among widely varying devices and environments.

Environmental optimization—Signal processing can be used to compensate for environmental factors, including noise, volume, location, distortion, and others.

Content abstraction—Some embodiments operate to separate the recognition event from the content delivered. Multiple contextual factors are used to deliver the preferred content at the right time on any or all devices.

Content Synchronization—In some embodiments, content is continually and automatically between devices in a loosely coupled manner. A history of transitions can be maintained to assist in personalization.

Figure 4:
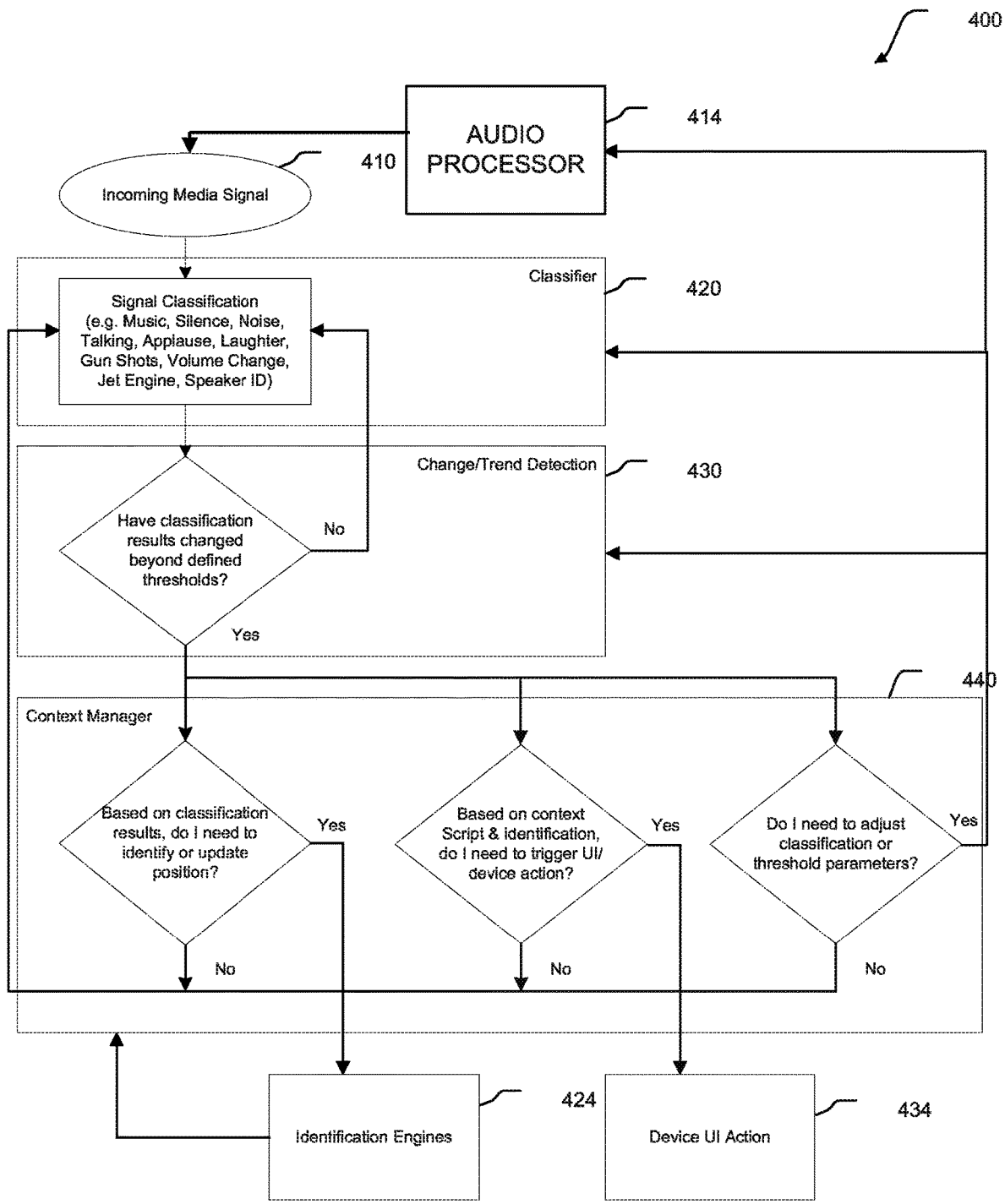
FIG. 4 is a logical flow diagram illustrating methods according to various embodiments of the invention.

FIG. 4 is a logical flow diagram 400 illustrating methods according to various embodiments of the invention. In this figure, a source of audio signal (e.g., a television or radio) provides the audio signal 410 to a classifier 420, the classifier 420 perhaps being associated with another application running on a consumer appliance, such as a cellular telephone or tablet computer. The streaming audio signal 410 is continuously sampled to determine its audio characteristics, such as tempo, pitch, rhythm, etc. for use in classification and other purposes, such as transition detection.

There are many possible classifications that can be determined by the classifier. Some of these include classifying the audio stream 410 as silence, music, talking, and noise, among others.

Silence is characterized by a low level of audio (e.g., a rapid rate of change in sound level that settles within the range of a selected floor and ceiling threshold). The floor is a low peak threshold, and ceiling is a high peak threshold. Music is characterized by the same factors as silence, but rhythm, tempo, and pitch, among others, are extracted from the signal 410 as features to determine that the audio is musical. Talking is characterized by the same factors as music, but the tempo, and rhythm are recognized to be low values, and features extracted for pitch are more concentrated. Noise can be classified as sound that doesn't qualify as silence, music, or talking, such as a monotone (sinusoidal), or car passenger compartment noise. The audio stream 410 can be processed by an audio processor 414 (e.g., a filter or an equalizer) to sensitize the system to expected transitions, if desired.

Once a classification has been determined, the detection of transitions occurs at the transition detector 430. By monitoring the characteristic measures provided by the classifier 420, along with the classification itself (provided by the classifier), and the explicit context and implicit context existing at that moment, the occurrence of a transition can be determined. A transition is detected by determining that there has been a change in at least one of the classification, the explicit context, and/or the implicit context—according to a set of threshold rules.

Explicit context is provided by a user entering data or activating a control, or by the existence of a concrete electronic signal (e.g., a person confirms that—"I am watching TV" on a television remote control, or the head unit within an automobile dashboard indicates "The car radio has been turned ON."). Implicit context is determined by looking at the characteristics of the recent sets of audio signal received.

For example, a stopped car has low noise content, whereas a moving car has high noise content. Thus, high noise content in this context could be used to detect a transition between stopping, and moving.

In another example, low talk content value with a high music content value could mean that music is playing, and a high talk content value with low music content value could mean a commercial break has occurred, or a cell phone is being used. An explicit context indication of a cell phone application running could be used to determine the difference, and to detect that a transition to a commercial break has indeed occurred. A change in the context itself may be used to detect a transition of interest.

Classifications based on context can be weighted as characteristics of the audio signal change (e.g., a television show changes to a commercial). Multiple thresholds can be set and reset by the explicit context (e.g., in a bar) and the values of recognized features (e.g., large noise component) when they are crossed. Changes in the measures of features can be tracked over time. Changes in these measures within selected windows of time (set by the classifier) can also be identified as a transition. Thus, changes in the thresholds can occur that depend on the classification, context, and previous recognition of content.

The context manager can determine the position in time within a recognized audio stream by communicating with identification engines 424—operating within a portable device, or in most embodiments, on a network. The windows of classification can be varied to reflect the characteristics of the environment, device, and content ("Context"); windows of classification may open for ranges such as 16 milliseconds, 100 milliseconds, 750 milliseconds, one second, or longer.

If there are too many transitions detected within a window, the window period may be shortened. Similarly, window time periods can be lengthened if too few transitions are being detected. In some embodiments, windows are called "blocks". The window length can thus be set to provide a classification over a particular timed basis (e.g., for an interactive show). This can be useful when the transition is identified, along with a particular position in the show (e.g., clapping near the end of the show). For example, a calling application, such as a user interface, can be informed that a particular point in a show has been reached. Actions of a device 434 can also be triggered when an a particular transition is detected at an appropriate time—such as an interactive toy associated with a particular television show being commanded to clap when the audio signal is classified as "clapping" and the show associated with the toy is in progress.

The context manager 440 can adjust parameters for transition thresholds and general classification on the fly. Thus, a period of silence as a transition to a commercial (from a show) can be more accurately monitored by using a window that is tending toward 750 milliseconds to 1000 milliseconds, rather than 500 milliseconds or 250 milliseconds. The context manager 440 can request additional information (data returned from the use of additional monitoring windows) to obtain more accurate identification of the audio signal classification.

Figure 5:
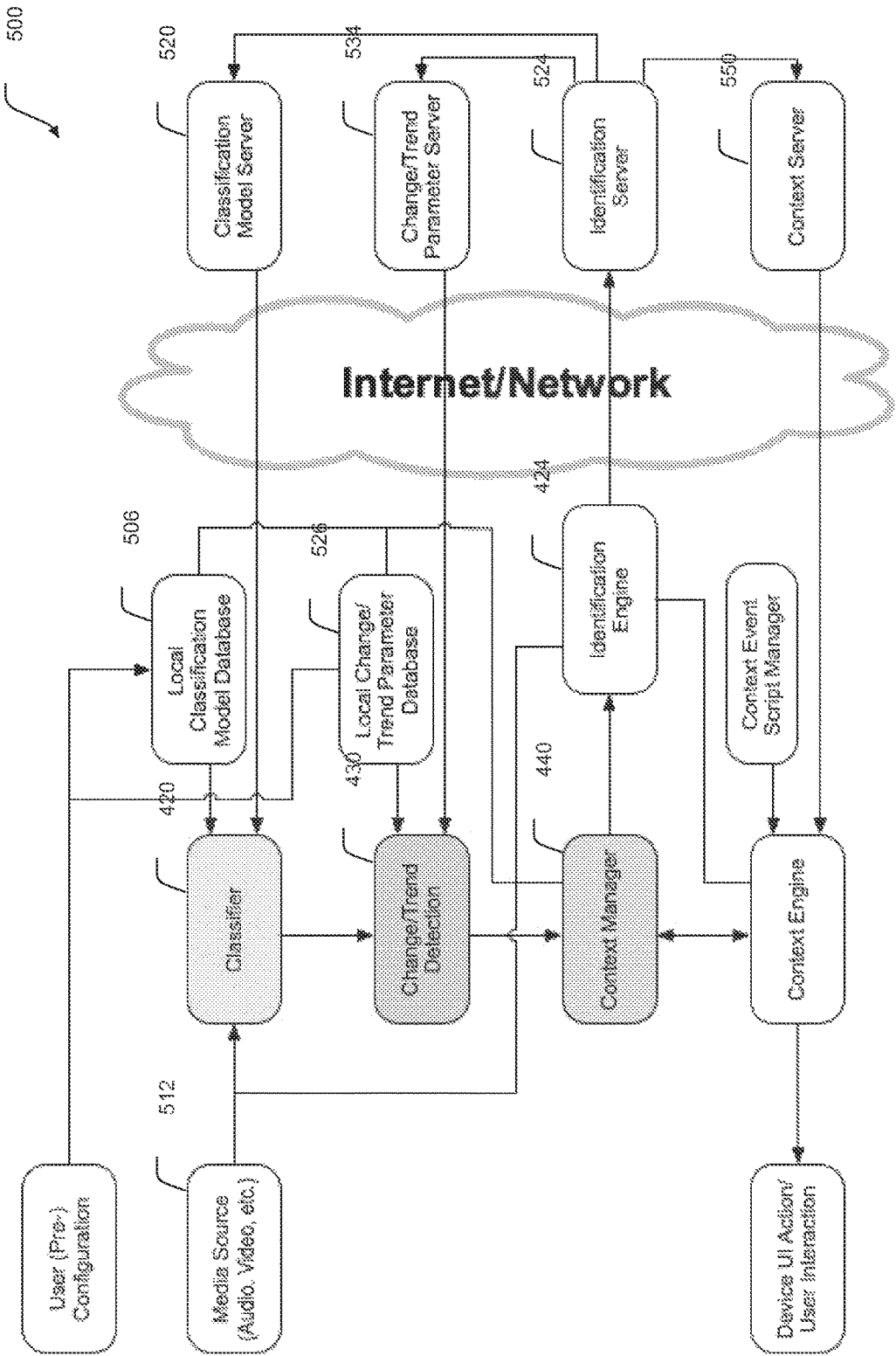
FIG. 5 is a block diagram of information flow within a system operating according to various embodiments of the invention.

FIG. 5 is a block diagram of information flow within a system 500 operating according to various embodiments of the invention. In this figure, one can see how the classifier 420, transition (change/trend) detector 430, and the context manager 440 fit into a more comprehensive interactive streaming identification and processing system 500.

The local classification model database 506 is accessed by the local media source 512, which may comprise a consumer device. The database 506 comprises a set of score values associated with measured parameters (e.g., laughing, clapping, etc.) for a given audio stream segment. These scores can be provided as a table. The classifier 420 can use these scores to help classify the current information in the audio stream. Classification can also be implemented using a networked server 520.

The local change/trend parameter database 526 can be kept on the media source 512. It can then be updated and revised with network assistance (e.g., the change/trend parameter server 534). In some cases, the database 506 is kept solely on a networked server (e.g., server 520).

The identification engine 424 operates to identify a signature created from the audio signal characteristics. The signature is compared to a reference, either locally, or over a network (e.g., using the identification server 524), so that an identification code can be determined (and perhaps the position in time within the audio stream). This code can be used to solicit and receive associated content (e.g., an offer to sell an album at a discount, where the album is related to the audio stream).

The context server 550 can provide additional and adjusted rules to modify context manager decisions. This can be useful as content changes over time—so that network resources are preserved (e.g., when multiple queries related to the same show or song arrive substantially simultaneously). Thus, patterns in identification behavior can be identified by the context server 550 (e.g., ten transitions within a 30 second interval for a particular commercial, which overburdens the network), and adjustments to the rules can be made so that transitions are detected less often. These adjustments preserve network bandwidth, as well as battery use in portable consumer devices.

Rule Based Contextual Classification Transitions—using context, classification, transitions detection, and digital fingerprinting with network assisted rules, content is identified, allowing the return of meta-data, images, and other data from a reference fingerprint via a connected network and/or local embedded reference repository.

Rule based contextual classification transitions (RBCCT) allow un-assisted end-user dynamic optimization of signal recognition for varying devices, environments, content, network preferences, and user preferences. For example, using RBCCT, an application can explicitly (or via defaults) indicate the context to be "TV", recognize a signal (audio or video) using network-driven streaming of fingerprints, allowing the rapid, synchronized return of meta-data/content. Using the explicitly-indicated context and a rules engine, this approach enables transitions of the signal source (e.g., an audio signal) to be detected contextually with a high degree of accuracy. Further, the rules for contextual classification and transition detection can be network-driven, allowing continuous improvements in recognitions and relevancy. Combining this approach with data on the position and timing within external content (e.g., a TV show), allows for automatic, synchronized recognitions. These technologies are useful to enabling the continual reception of a signal on loosely connected devices, while conserving resources that synchronize with external content (e.g., TV, radio, etc.), without any end-user interaction, to a high degree of accuracy for millions of concurrently-operating devices.

Context can be used with classification and change detection within audio and video streams to identify and continuously synchronize the content. Context consists of explicit content and implicit content. Explicit context is one that's set by the end-user or external application. Implicit context is one that's derived from analyzing a signal to determine its characteristics. Using a combination of explicit and implicit context determination allows more accurate identification of transitions.

Explicit Context—may comprise a hierarchy that allows for more fine-grained control of interactive content and resource consumption (TV, Radio, etc.). A simplified example of a hierarchy for the explicit parent contexts of "TV" and "CAR", along with numerical identifiers, is shown in Table II:

TABLE II

| PARENT CONTEXT | CONTEXT | EXPLICIT CONTENT ID |
| --- | --- | --- |
| TV | TV | 1000 |
| TV | TV GAME | 100001 |
| TV | TV DANCE | 100002 |
| TV | TV MUSIC | 100003 |
| TV | TV MOVIE | 100004 |
| TV | TV CARTOON | 100005 |
| TV | TV COMMERCIAL | 100006 |
| TV | RADIO | 100007 |
| CAR | CAR | 2000 |
| CAR | CAR RADIO | 200001 |
| CAR | CAR CD | 200002 |
| ... | ... | ... |

Additional explicit contexts may include language, country, and a commercial identifier (to select a single match from multiple ones), among others.

Implicit contexts are determined using local factors and features of the content signal. Examples of implicit contexts include time, location, device type, the signal classification (Silence, Mood, Tempo, Pitch, Energy, multiple features extracted from audio and/or video, etc.), among others. Implicit contexts may also be determined based on network information. This allows automated improvements in delivering the most relevant interactive content. Implicit context may also exist in the form of a hierarchy that allows for more fine-grained control of interactive content and resource consumption, with run-time, network-assisted improvements. Table III is an example of an implicit context hierarchy, with the parent implicit contexts of "TV" and "CAR". In this case, instead of receiving a signal from a car radio that explicitly indicates the CAR, CAR RADIO explicit context, the consumer's portable device may recognize that a vehicle navigation voice has been received, and thus, the CAR, CAR RADIO context is implicitly determined.

TABLE III

| PARENT CONTEXT | CONTEXT | IMPLICIT CONTENT ID |
| --- | --- | --- |
| TV | TV | 1000 |
| TV | TV GAME | 100001 |
| TV | TV DANCE | 100002 |
| TV | TV MUSIC | 100003 |
| TV | TV MOVIE | 100004 |
| TV | TV CARTOON | 100005 |
| TV | TV COMMERCIAL | 100006 |
| TV | RADIO | 100007 |
| CAR | CAR | 2000 |
| CAR | CAR RADIO | 200001 |
| CAR | CAR CD | 200002 |
| ... | ... | ... |

Context Management is useful for providing an adaptive platform that is effective and scalable. Synchronizing the content delivered with the audio and video being displayed on the same or another device is difficult in a multi-device environment with no user intervention. Mass adoption can be facilitated with a system that synchronizes without end-user action or complex control channel system while providing transition events to applications to allow highly interactive application experiences. Several features of such a system may include the following.

History Management—the ability to relate and replay interactive experiences on the same or other devices.

Recognition Engines Caching Meta-Data and Assets—to analyze queries and responses for the purposes of determining whether content has changed.

Throttling—limiting the number of queries by size, time, and frequency. Interacts with a service network to improve the accuracy and reduce the consumption of resources.

Application Notification—controls when and what is delivered to the calling application, which is useful for providing a simplified end-user experience. This feature includes the ability to retrieve content from third-party sources.

Transition Overrides—can be accomplished with History Management, Application Notification, explicit preferences, implicit preferences, and external sources.

Adaptive Fingerprint Streaming—operates to send sub-fingerprints immediately to the recognition engines. Can make use of context(s), network information, transitions, etc. to control how many fingerprints are created and sent. Return of recognitions stops fingerprint generation. This activity includes the use of local and remote identification (fingerprinting) engines. Some embodiments include a method of dynamically configuring fingerprint-based recognition, comprising using classification output information to select a fingerprint algorithm. This is because some algorithms work better with loud environments, and others work better in quiet environments; some provide larger fingerprints, and some provide smaller fingerprints (which can be useful when large numbers of fingerprints are processed).

Social Personalization—includes automatically delivering preferred interactive content based on context (explicit and implicit), language, location (country and region), and commercial content in response to recognition of the content and a relevant transition.

Pairing Via an Audio Tone—fingerprinting can be used to uniquely identify a temporal audio tone for purposes of linking devices, groups, and communities. Audio played by one device could be personalized as a tone associated uniquely with that device.

Cloud-Based Pairing—allows one device to see another "paired" device's history of recognitions, the other device being one of multiple devices, users, and/or groups. Could be used to allow ads from one device to be accessed by another, driving many social interactions.

Many embodiments may thus be realized. A few of these are briefly noted below:

Using classification with digital fingerprinting to identify portions of an audio stream and/or file.

Using a method of detecting changes ("transitions") in an audio signal to select a fingerprinting algorithm.

Using a determined context to assist with classification and change detection of audio and video streams.

Using a combination of classification, transition detection, and digital fingerprinting to return meta-data, images, and other data from a reference fingerprint via a connected network and/or local embedded reference repository.

Streaming Client Design

Figure 6:
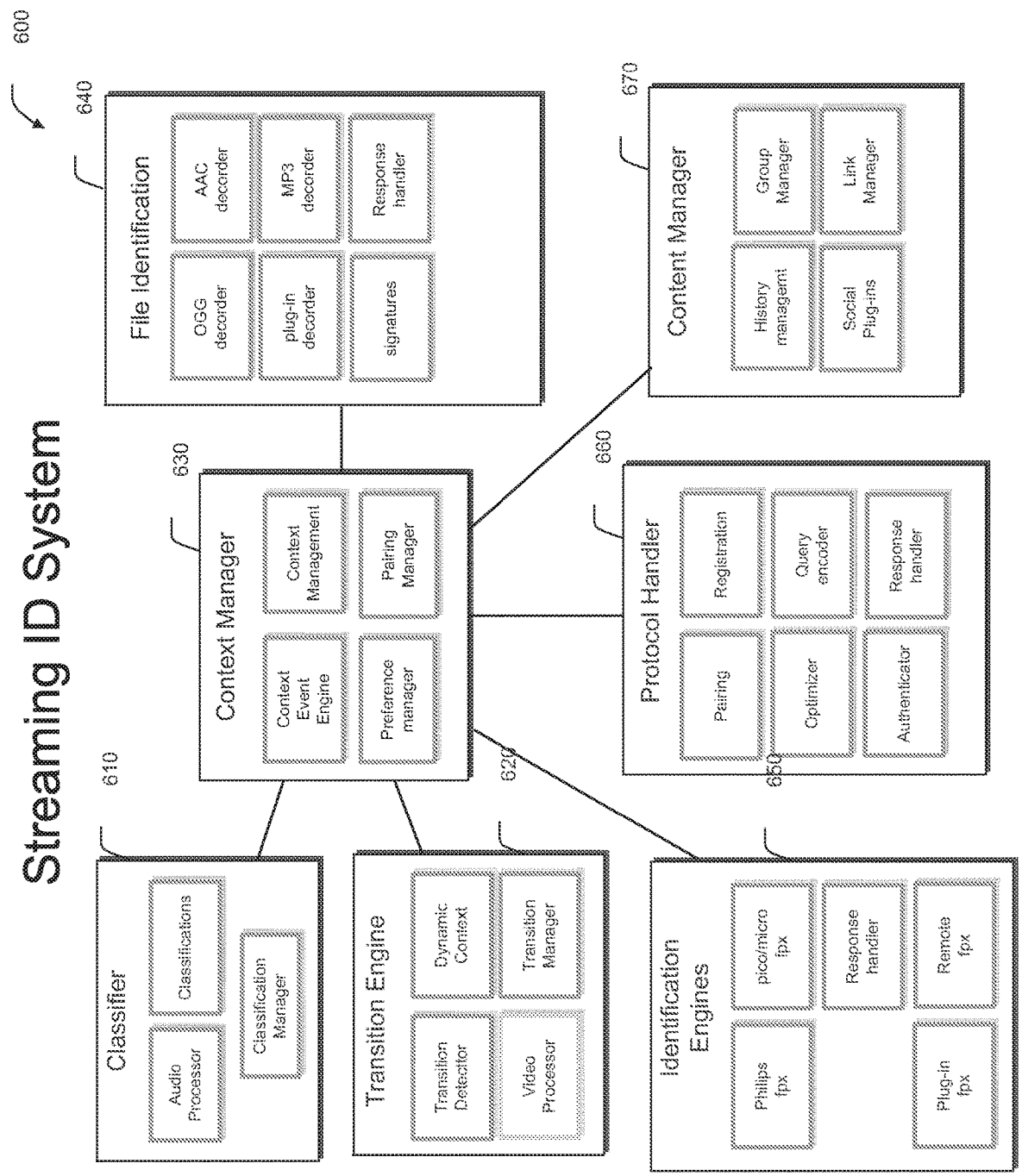
FIG. 6 is a block diagram of streaming client apparatus components according to various embodiments of the invention.

FIG. 6 is a block diagram of streaming client apparatus 600 components according to various embodiments of the invention. The streaming client, as an embodiment of an apparatus 600, allows a connected device (e.g., wirelessly connected to the Internet) to continuously classify audio (and video) transitions, and to synchronize content using fingerprinting and/or media recognition technology, such as the following Gracenote® offerings: standard MID-Stream, Link, Cover Art, Images, and the Web API (e.g., a browser). This capability supports many use cases, from Interactive TV, to Game voting, to Social Networks, to Rating. Streaming client apparatus 600 logical components may be realized as hardware modules, software modules, or a combination of both. These modules will now be described.

The classifier 610 analyzes audio (and/or video) and defines multiple classifications with confidence intervals. Examples include: Silence, Noise, Talking, Humming, and Singing. The audio and/or video signal source device is not shown in this figure, but these are well known to those of ordinary skill in the art, and have been mentioned previously (e.g., TV audio).

The audio processor component of the classifier 610 provides dynamic equalization, to emphasize or remove certain frequencies, and drop spikes in the audio signal. Contextual processing is also accomplished. The audio processor receives continuous audio, such as PCM audio, using output from the classification manager with a rules engine to decide when to fingerprint the content and to send queries to the GN Service. Multiple classifications are used to determine when a particular change in the audio has occurred (a "transition" in the audio, such as from silence, to talking, etc.). These changes may include increasing or decreasing pitch, mood, tempo, silence, noise and/or rhythm, among others.

Dynamic equalization may be used to pre-process audio within the classifer 610, to improve recognition via digital fingerprinting. This function helps compensate for different characteristics of devices, noisy environments, distorted audio, and lower energy. The incoming audio signal processing can be turned on or off at will. Samples can be taken every few minutes, rather than every second, or multiple times per second. This might occur, for example, when the explicit context includes "TV", and the TV appliance has been turned off.

The transition engine 620 includes the transition detector, which receives classification measures and audio from the classifier 610, and assigns transitions as they are detected, based on measures of the incoming signal, and explicit/implicit contexts. The result is provided to the transition manager.

Transitions can be used, for example, to separate television shows and their commercials. This operation, in turn, can be used to implement real-time fingerprint generation and storage for commercial content, to update the recognition fingerprint database in near real-time (e.g., commercials and news content can be recognized within a matter of seconds after the very first broadcast—without relying on pre-recorded content).

The video processor of the transition engine 620 is used to detect video transitions. This component receives video signals corresponding to the incoming audio signal, so that video fingerprint patterns can be used to assist in identifying transitions in the content.

The dynamic context module within the transition engine 620 receives information from the context manager 630, to adjust the thresholds and measures used to detect transitions by the transition detector component. Thus, different contexts may be determined, which in turn will cause different transitions to be detected.

The transition manager module within the transition engine 620 manages the other components of the engine 620, using determined context to adjust the operation of the other components.

The context manager 630 dynamically synchronizes the apparatus 600 to an audio/video source (e.g., TV or other). Multiple parameters from the input stream and responses to content are used to decide whether additional queries are needed, and if a response object is sent. The context manager 630 decides what to fingerprint, when to fingerprint, and what identification engines 650 to use, and when identification data should be cached locally.

The context event engine within the context manager 630 determines whether to deliver transition event information received from the transition engine 620, based on the context, to the identification engines 650, or to an application.

The preference manager within the context manager 630 allows explicit settings of behaviors (e.g., can be accomplished by an application and/or an end user), such as how important battery conservation is, or how important bandwidth conservation might be, within the realm of other priorities, such as delivery of sale information.

The pairing manager within the context manager 630 operates to communicate with modules in the content manager 670. The pairing manager can pair devices, so that one device can have access to (share) all of the recognition history of another device.

For example, a sound can be used to produce a signature for a limited time period—by a sending device that submits a request to allow pairing. That sound is played by the sending device, and received by and coupled with a request for pairing by a receiving device. The receiving device, in turn, sends the sound to a server. The signatures of the reference audio for each device (sending and receiving) can thereafter be compared at the server, assuming the sound transmission from the sending device and pairing request from the receiving device are received at the server within a designated window of time, such as 60 seconds. This pairing process can be accomplished at the server, perhaps to provide game playing activity—based on a group of paired cell phone devices.

In this way, a personalized sound signature that is unique to one device can now be recognized by another device. In addition, all recognition activity can be shared between the two devices (sending and receiving), so that recognition events on one device can also be sent to the other device. Sharing can be from a known source (e.g., from a user that has logged in), or anonymous. In other words, pairing activity by either the sending device or a receiving device can be anonymous—use login is not required.

The file identification module 640 includes several decoders. These decoders, such as the AAC (advanced audio coding), OGG (Ogg open container format), and MP3 (moving pictures experts group (MPEG)-1 or MPEG-2 audio layer III) decoders operate as known by those of ordinary skill in the art. They are used to decode files in different formats to produce PCM audio. The plug-in decoder can be used to decode proprietary formats into PCM.

The response handler within the file identification module 640 manages the decoding processes, file input, and errors. The response handler also can make decisions about which decoder should be used at a particular time.

The signature module provides a local cache of signatures (e.g., fingerprints). The local signature cache includes signatures developed internally and/or by third parties. These can be used by the identification engines 650 to rapidly re-synchronize to a variety of positions within a monitored audio or video stream.

The identification engines module 650 produce signatures and delivers them to the context manager 630 and other modules. A variety of algorithms can be used (e.g, local Philips fingerprinter, local third party fingerprinter, remote fingerprinting via networked server) to receive PCM audio, and produce a signature output. The response handler within the identification engines module 650 operates to manage errors in fingerprint signature generation. The response handler can request additional signatures, as needed.

The protocol handler module 660 sends requests for identification, pairing, and rich metadata and imagery. The registration module handles device registration. The authenticator module might be used for local authentication. The pairing module can be used to send/receive requests to pair devices. The response handler module within the protocol handler module 660 operates to manage errors in communications, such as when a network is no longer operational. The response handler module can also identify networks, to determine system behavior (e.g., whether or not movie trailers will be played). The query encoder/decoder module operates to format communications into the appropriate protocol.

The content manager module 670 manages sending and receiving content that may be cached locally, as well as push notifications from the network. Local history can be cached, as well as history associated with a group of paired devices. The link manager within the content manager module 670 is used to retrieve links to products, for example, that may be recognized as part of a presentation made in audio or video signals. The link manager also retrieves specialized requests from the network for local content to be cached, via link identifications that may be returned, based on applications running, or content that is recognized.

Figure 7:
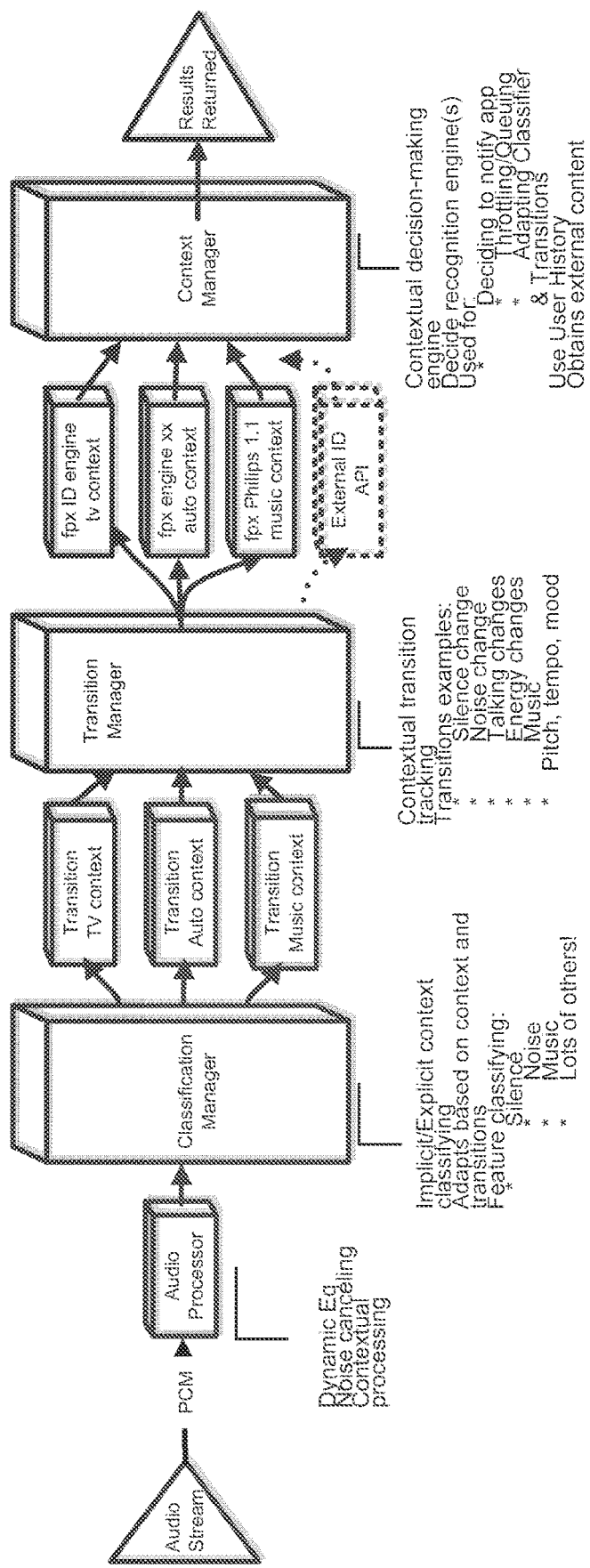
FIG. 7 is a block diagram of a streaming client apparatus operating according to various embodiments of the invention.

FIG. 7 is a block diagram of a streaming client apparatus 700 operating according to various embodiments of the invention. This diagram provides a different arrangement of the system functions shown in FIG. 6. While the conceptual arrangement and coupling are slightly different, the operation of individual components is the same.

Thus, some embodiments include a mobile device that comprises at least one of an optical or audio sensor that recognizes transitions of interest in content as they occur within a given context, and responds by displaying/playing related content. Some embodiments include a medium that stores instructions which, when executed, direct a mobile device to operate in this way.

In some embodiments, a cellular telephone or computer tablet connected to a network is endowed with the ability to synchronize with audio and/or video content received through a microphone or optical detector, for example. Thus, content that is provided by a radio or TV set can be recognized to determine actors, artists, related movies, and other information as meta-data. Links to promotions, including a URL (universal resource locator), can offer the opportunity to purchase related merchandise.

The ability to automatically and continuously synchronize to content based on audio or video input provides many advantages. For example, a cellular telephone device can be carried into a private residence, and used to recognize the fact that halftime commercials for a football game are being reported. Based on the recognition of a particular commercial, an option to buy or picture of the product can be returned to the portable consumer device. In some embodiments, the particular commercial variant is recognized. This permits advertisers to determine the take rate for each variant of a particular commercial.

Thus, the consumer is provided with a more engaging experience. For example, if a particular movie is playing on the TV, information about the actor/actress can be displayed. Perhaps the titles of other movies that are similar to the movie being watched can also be displayed. Opportunities to rent or buy similar movies may be offered.

In some embodiments, the audio is fingerprinted. When the fingerprint or signature is generated, additional data can be retrieved. For example, on a children's television show, transitions to commercials can be detected and interactivity can be provided. Depending on the context, different transitions of interest may be defined. These transitions can be used to trigger various activities, such as launching applications, the display of related subject matter, etc.

A transition may be identified by a change in the content. This could be a period of silence (such as when a commercial begins during a program). However, other changes are also useful to recognize. These include changes in pitch, energy, the occurrence of music versus talking, and changes in rhythm. A context manager determines whether a transition has occurred, based on the context. This allows a determination of whether the transition has been made to a commercial, as opposed to a more intense scene within a television program, for example.

Prior solutions have implemented watermarks embedded within content to trigger the display of additional, related subject matter. However, such approaches suffer from synchronization issues.

To provide a viable alternative, some embodiments continuously monitor audio from the surrounding environment, using features defined by the environment context to classify events and detect transitions. One way in which a significant amount of power can be conserved is to refrain from extracting fingerprints, unless a particular type of transition occurs—where fingerprints provide a useful adjunct to the transition of interest.

The context manager can also determine how aggressively to search for transitions. For example, if a movie viewed on TV is known to be a two hour special, only certain types of transitions receive a high weight. In this way, the number of transitions to be detected is reduced. On the other hand, in a bar, where there are many sources of sound, equalization can be selectively employed to drop portions of the audio stream. That is, the audio stream is punctured deliberately over selected ranges of frequency. The punctured audio stream can then serve as the basis of recognition for transitions. This can save device operational power because fewer features are extracted to determine transitions of interest. Thus, transitions can be classified based on the context, with fingerprints used as a final adjunct for triggering selective activity.

Classification can also be used to dynamically configure the client apparatus. Features, such as items in the signal, can be recognized for the purpose of configuring the client.

The client apparatus might comprise a cellular telephone, a tablet computer, or some other electronic computing device. Using multiple parameters in the signal, classification can be used for transition detection to adapt to use in environments ranging from a bar, with lots of noise and many people speaking, to a quiet home, with a couple watching a movie. Another example environment is that of a car with the radio playing. There will be road noise, channels changing on the radio, and the voice of an announcer that comes and goes. If the windows are rolled down, additional road noise is present.

Thus, some embodiments may include a method of identifying the context associated with a mobile device, and dynamically configuring the mobile device for detecting transitions of interest as the context changes. Competing interests may be handled as part of this method; or as a separate method that involves identifying more than one context associated with a mobile device, and selecting one of the contexts for configuration/identifying transitions based on a stored policy.

The training module can dynamically train and configure a signal processing unit. Classification and transition detection within a particular context can also be used to configure the processing unit. This helps to process signals in environments where operation is difficult: such as a bar where a TV is operating and multiple people are talking, or a house party where multiple people are watching TV while talking.

In some embodiments, speech recognition apparatus and software are aided by the use of context determination and transition detection. Software applications can also be assisted by context determination and transition detection. For example, a software application designed to work with a TV show can be tailored to ignore music. Loud talking can be filtered and ignored. All of this activity can be based on context. In some embodiments, time-shifting between received audio signals can help distinguish between sources that are close by, and those that are far away.

Figure 8:
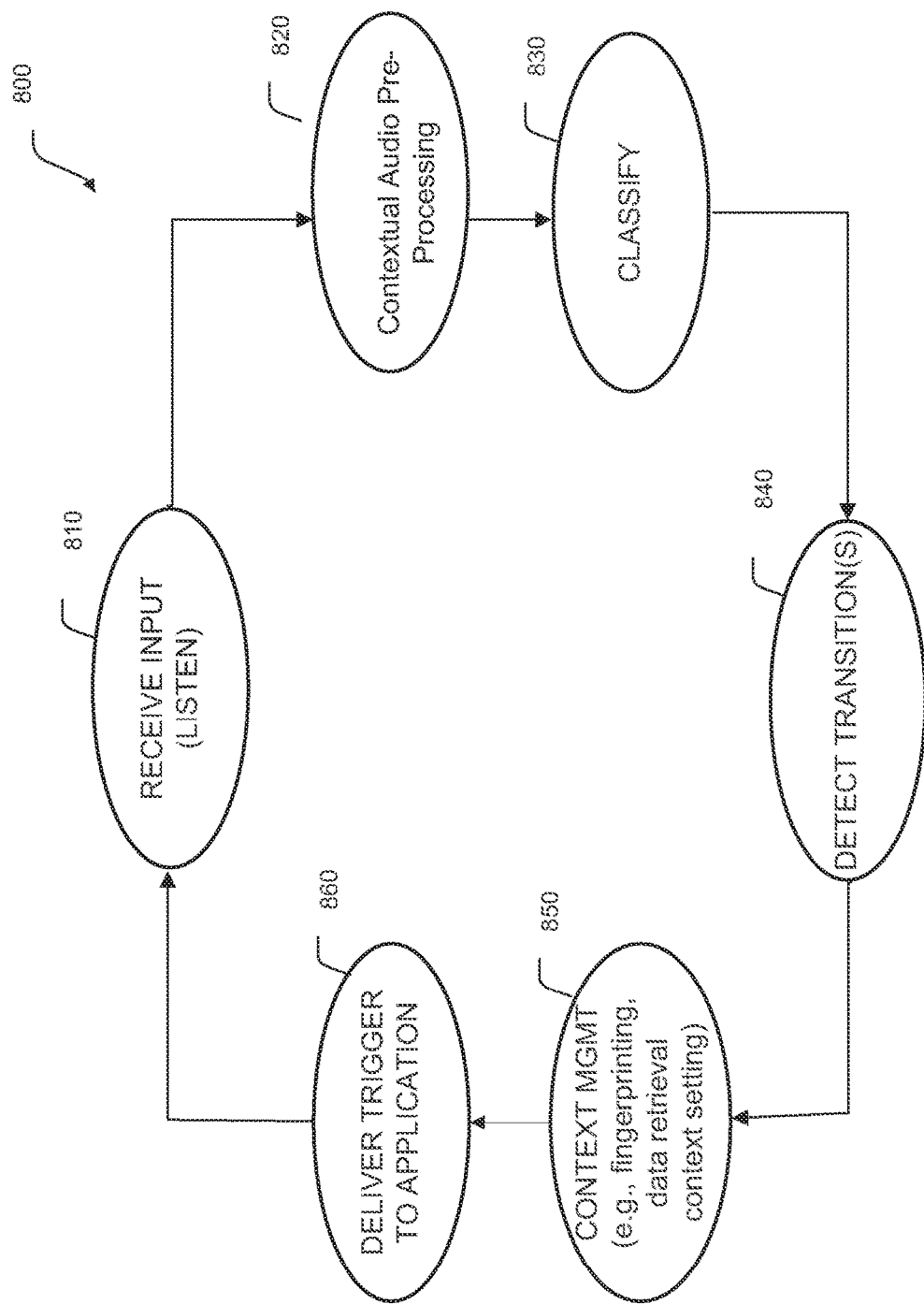
FIG. 8 is a state machine diagram illustrating operations according to various embodiments of the invention.

FIG. 8 is a state machine diagram 800 illustrating operations according to various embodiments of the invention. Context can assist pre-processing signal, thresholding, and can be used to classify the input data, which may be an audio or video data stream, or both. The transitions detected are not only noted, but characteristics of the transition are also given. This can be seen in the state machine diagram 800, which in some embodiments may describe operation of the Interactive Streaming Identification System (ISIS) engine.

At block 810, listening for an audio signal begins. A decision tree can be used to determine when the listening activity is complete or canceled. At block 820, the signal is pre-processed based on context. At block 830, the received signal is used to classify the received information, using a classifier. The GN service can be used to assist in classification at block 820. However, a server call is not needed; this part of the process can be done on the client as well. The classification engine is configured, and can dynamically adjust to operate in noisy environments, quiet environments, and with different kinds of content. GN services, such as fingerprinting and/or data retrieval, may be used when a transition in the classification outcome is detected.

Another driver is the delivery of information (e.g., triggers) to applications at block 860. These may occur when transition are detected at block 840, such as transitions of people speaking inside the content.

Certain kinds of transitions do not proceed to permit detecting another transition, because the content has not changed. For example, music or a TV show may exhibit cars driving, or somebody clapping in a game show or sitcom, and the application will provide certain activities when the clapping occurs. In each case, the audio/video content is still part of the show, so there is no transition from one form of content to another (e.g., to a commercial), but the behavior of the interactive application changes in response to those transitions occurring within the current content.

Block 850 uses the input from prior states and evaluates, along with GN Services (e.g., fingerprinting and/or data retrieval), prior identification engines used, and other inputs to determine triggers to be sent to an application, based on these components, and the determined context.

Sometimes a network is used to conduct a search. For example, when the ISIS engine is active and a TV show provides audio input, a transition can be detected via a large increase in crowd noise forming part of the TV show. In response, the application could provide a display of fireworks on the screen. In another example, when a vacuum cleaner is turned on as part of a commercial, a link to the internet sale site for that particular brand might be presented to the viewer. By classifying the characteristics of the signal the mood can be established for that context allowing many application uses.

In some embodiments, the ISIS engine can detect that playback has been paused, or that the viewing audience is clapping. These contextual clues can be detected, and used to activate certain activities for further interaction with the viewing audience. Thus, the ISIS engine can monitor and detect TV audio and video content, as well as sounds in the environment that surround the TV (e.g., clapping), to provide interactive entertainment. Specific embodiments may vary by what is detected, and what is classified. Noise, speech, and music content recognition and classification are known to those of ordinary skill in the art.

Thus, transitions can be used to trigger activity. Change in classifier states can trigger the beginning of media recognition services, perhaps using one or more fingerprints, either locally or remotely. The trigger can be used to present a visual effect (e.g., fireworks) or some other action on a handheld device (e.g., cellular telephone) present near the viewer.

Another triggered activity might be taking a local fingerprint to determine, if music is the context, whether it is the theme song for one of five TV series that have local fingerprints stored in the handheld device. Many other embodiments are possible.

In some embodiments, a combination of local reference and network-based comparisons are used. Decisions can be made based on the comparisons. If the context is not recognized locally, that may also represent a transition of interest. Block 850 controls this. An application might be running on a user device (e.g., cellular telephone) to recognize particular types of content and if these are not found, that may have a specific meaning. In some cases, it could be an advertiser searching for their commercial within a given TV show, or the network operator searching for specific content within a TV show—if these do not occur locally, it can mean that another activity is occurring within the show.

In some embodiments, dynamic classification is used. That is, the classifier can be tuned by context, as part of a feedback loop. When the classifier is provided at block 830, a transition is detected at block 840, and the context manager determines a change of interest occurred, an activity can be triggered at block 860. This activity provides additional context, which leads to an adjustment of the classifier, as a feedback mechanism. The mechanism includes the contextual audio pre-processing, classifier, the area of transition, action by the context manager, activity by the trainer classifier, and back to the classifier operations.

So the context can influence the classifier directive by enabling or disabling certain classes, but it can also affect the transition criteria, i.e. the thresholds that are used to detect a transition. For example, the transition detector may indicate "it's a movie" and it is known that the movie has more talking vs. music to it, so the classifier might be prone to classifying something as talking when it actually isn't. So the sensitivity on the talking threshold can be reduced: in that case a talking transition is only detected when the talking changes over a long period of time, or there is some other indication of talking. In this way, transition threshold detection can be adjusted, which in turn affects classification.

In another example, such as in a car, with audio content provided by the audio of a car radio, the classifier can be adjusted to indicate music, or non-music. The determination of whether to operate within the context of "car" can be made based on noise, background sounds, content, etc. The user can also be prompted to indicate the environment. This determination can be made by the context manager in block 850, which receives explicit input (e.g., user data entry), and implicit input (e.g., features extracted from signal strongly indicating road noise, GPS movement indicating a traveling speed of greater than 20 miles per hour). Thereafter, until other context cues are received to indicate otherwise, the context manager may be configured to operate within the confines of the "car" context.

Other examples include the sound of glasses clinking together and with a multitude of people talking, along with a mapping input. This could indicate the context of a "bar". Street noise and a stationary location near a bus stop at a particular time in the bus pickup schedule may indicate the person transporting the client device is waiting for the next bus to come.

The context manager thus informs the classifier as to what classifier profile will be used, along with the transition thresholds. In this way, performance of the classifier can be improved by receiving information from the context manger.

Adaptive adjustment of the classifier thresholds, using a ceiling and floor, and/or other thresholds can be implemented, with the car (or other environment) as the reference context. This adjustment affects the classification of certain content, perhaps using noise level thresholds ranges, so that specific characteristics of content can be detected and classified to determine whether a transition has indeed occurred.

The end result can be improved recognition for the consumer, longer battery life, network bandwidth conservation, and a reduction on the network and server loading.

In some embodiments, many operations in the system occur locally. For example, high classification accuracy, to determine when transitions of interest occur, can be aided by improving the quality of input to the context manager.

"Transitions" comprise any defined change in the signal of interest, such as a change in listening channel, the ending of a song, the occurrence of a disc jockey (DJ) talking over a song, such as the DJ fading out at the beginning of the song, or fading in at the end of the song, etc. Transitions can be detected within the media stream, or outside of the media stream (e.g., the acceleration of a car engine within the car environment, or the sudden cessation of engine noise).

Rules can be used to control the classifier (e.g., do not search for video transitions, because a video program is not usually viewed within a car that has a single occupant). In some embodiments, the context and transition thresholds combine to form an adaptive, dynamic transition recognizer.

A transition can be determined using a combination of thresholds of different weights that are provided by the classifier. Thus, the classifier can indicate, via threshold profiles, the likelihood for noise occurring or the likelihood of silence, as well as the likelihood of music, given signal and noise thresholds, for example.

The detection of transitions can be used to couple to a network to send or retrieve information, to communicate with another application, or to update the context manager for additional profiles that the trainer classifier module can adjust classifier data and transitions.

Thresholds can be absolute, or adaptive. Thus, thresholds can be based on history. Some thresholds might be adjusted higher as the noise level increases, and lowered as the noise level is reduced.

A scale (e.g., 0 to 10000) can be used to represent a level of confidence. A time window (e.g., one second) can be used and adjusted, depending on the context. For example, if the floor or ceiling thresholds are exceeded the window might be maintained, and if they are not exceeded, the window might be lengthened. This information can be fed back to the context manager.

In some embodiments, the detection of silence is dynamically configurable. For example, a listening window implemented as a rolling time block of 250 milliseconds can be used, averaging over the last two blocks, half a second. This can be used to detect the transition of changing a TV channel, even when talking occurs at the same time, because the voice doesn't represent input that influences detection of the transition. The size and number of rolling time blocks may be configured based on context implicitly and explicitly.

Thus, in some embodiments the transition manager decides to increase the window size to determine the average changes over some period of time covered by the window. Content from one length of window can be compared to content from a different window length, and flags can be set upon the crossing of threshold values, so if the range is zero to 10000, movement above 7000 might indicate a change from music to noise, versus talking.

In some embodiments, the classifier differentiates between music and non-music. The difference between music and non-music is a threshold level. Thresholds can be kept constant while the listening window is varied. Similarly the listening window length can be kept constant while the thresholds are varied. In some embodiments, the listening window length and threshold are both varied.

Thus, in some embodiments, the classifier output is directed to the transition detector. Transitions then determine the classifier output as a feedback mechanism. In this way, transitions can ultimately determine the classification of new input.

In some embodiments, the context manager is explicitly informed of the context. For example, the context may be set as an interactive TV show. When that occurs, the context manager can configure itself to detect particular transitions of interest, including appropriate threshold overrides.

In some embodiments, the output of the trainer classifier module goes to a classified data module and/or the transition detector module. This accommodates different models for noise classification, depending on the kind of environment, for instance, that the trainer classifier might want to activate in the classified data module. In many embodiments, the operating system and the physical environment are known.

For example, in the auto environment, talking between occupants of the vehicle occurs and the classifier identifies spoken content versus music. Likewise, the existence of multiple voices can be determined as opposed to a single voice. A different context model may be loaded into the classifier depending on the situation. In some embodiments, the context manager communicates directly with the classifier and the transition detector without going through the trainer.

The trainer/classifier can operate with a variety of profiles. That is, the trainer/classifier can operate as a decision-maker, using a rules engine in the context manager. Thus, it can operate as a profiling modeling engine that changes dynamically. The trainer/classifier can receive instructions from the GN services network.

In some embodiments there is a context manager module and a trainer module. This version may use the trainer/classifier as a pass—through module. Here, the context manager might be aware of only two different context classes. For example, a bar versus a single voice. Depending on the determined context, a particular profile is put in place. Thus, some embodiments of the invention comprise a context manager module operating within a networked node or a mobile device, to detect selected transitions of interest, based on a currently identified context. The context manager can be used to identify the context associated with the mobile device.

As the situation becomes more complicated, the context can be differentiated more particularly, so that the trainer/classifier can adjust various thresholds to respond appropriately to that context. In this case, the context manager captures the context profile that is appropriate, and the trainer/classifier translates that into threshold adjustments and loading different classification models. For example, this might increase the time range for observing a window of silence up to 1.5 seconds. Thus, the context manager can determine adjustments made to the transition detection mechanism.

In some embodiments, multiple microphones are used to gather input and to cancel noise. The microphones may be located in a TV, a head unit, a cellular telephone, and in other locations.

Adjustments to the detection process may be implemented to accommodate energy conservation and bandwidth. For example, if the battery to a portable device is running low, the detection mechanism can be throttled back to operate less frequently. Similarly, if the bandwidth limit for communication with the portable device is being approached, detection can also be throttled back.

While specific methods, tasks, operations, and data described herein are associated above with specific systems, other embodiments in which alternative apportionment of such tasks and data among the various systems are also possible.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Example embodiments may be implemented in digital electronic circuitry, or in computer hardware, firmware, or software, or in combinations thereof. Example embodiments may be implemented using a computer program product (e.g., a computer program tangibly embodied in an information carrier in a machine-readable medium) for execution by, or to control the operation of, data processing apparatus (e.g., a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communications network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a field programmable gate array (FPGA) or an application-specific integrated circuit (ASIC)).

The computing system can include clients and servers. A client and server are generally remote from each other and typically interact through a communication network. The relationship of client and server arises by virtue of computer programs running on their respective computers and having a client-server relationship to each other. In embodiments deploying a programmable computing system, it will be appreciated that both hardware and software architectures may be considered. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set forth hardware (e.g., machine) and software architectures that may be deployed in various example embodiments.

Figure 9:
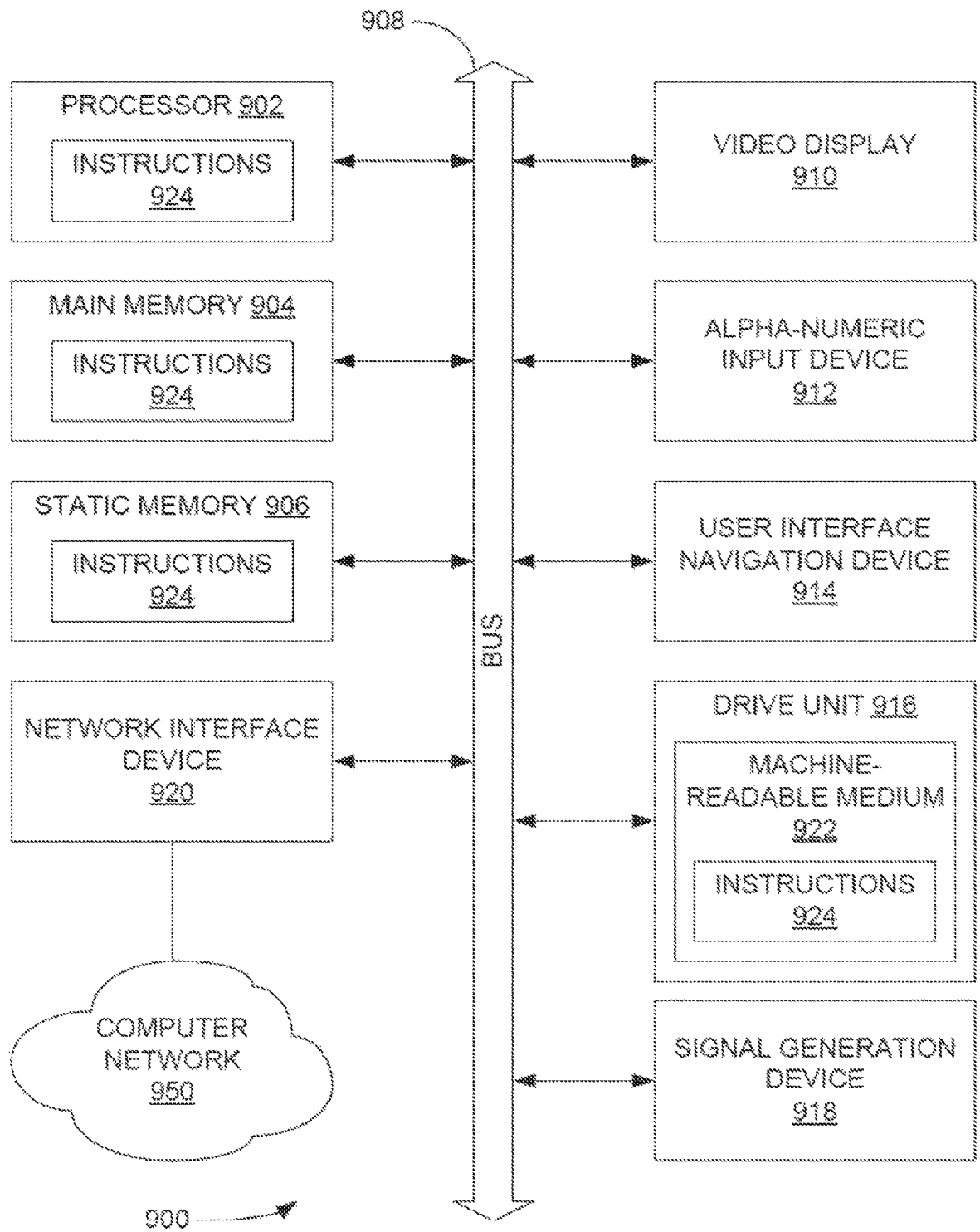
FIG. 9 is a block diagram of a machine in the example form of a computer system within which a set of instructions for causing the machine to perform any one or more of the methods discussed herein may be executed.

FIG. 9 is a block diagram of a machine in the example form of a computer system 900 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a microphone and/or optical sensing device, such as an image sensor), and a network interface device 920. The signal generation device can be used to provide audio and/or video input to the various modules described previously. The input, as a streaming signal, can be classified and used to detect transitions of interest.

The disk drive unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

The instructions 924 may further be transmitted or received over a computer network 950 using a transmission medium. The instructions 924 may be transmitted using the network interface device 920 and any one of a number of well-known transfer protocols (e.g., HTTP). Examples of communication networks include a local area network (LAN), a wide area network (WAN), the Internet, mobile telephone networks, Plain Old Telephone Service (POTS)

networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible media to facilitate communication of such software.

In some embodiments, the system 900 comprises a networked node that includes an input port and a context manager. The input port (e.g., network interface device 920) can be used to receive information from a mobile device. The context manager can be used to identify a context associated with the mobile device, and to provide a list of transitions of interest which the mobile device is to subsequently listen for and identify. Indications of the occurrence of the transitions may be received by the node and used to adjust the configuration of a classifier operating within the node, within another node, or within the mobile device.

Thus, methods and systems for generation and employment of streaming content identification may be implemented in various ways. Some operate entirely within a single apparatus, and others divide up the workload among different elements in a system. A few variations will now be described.

Figure 10:
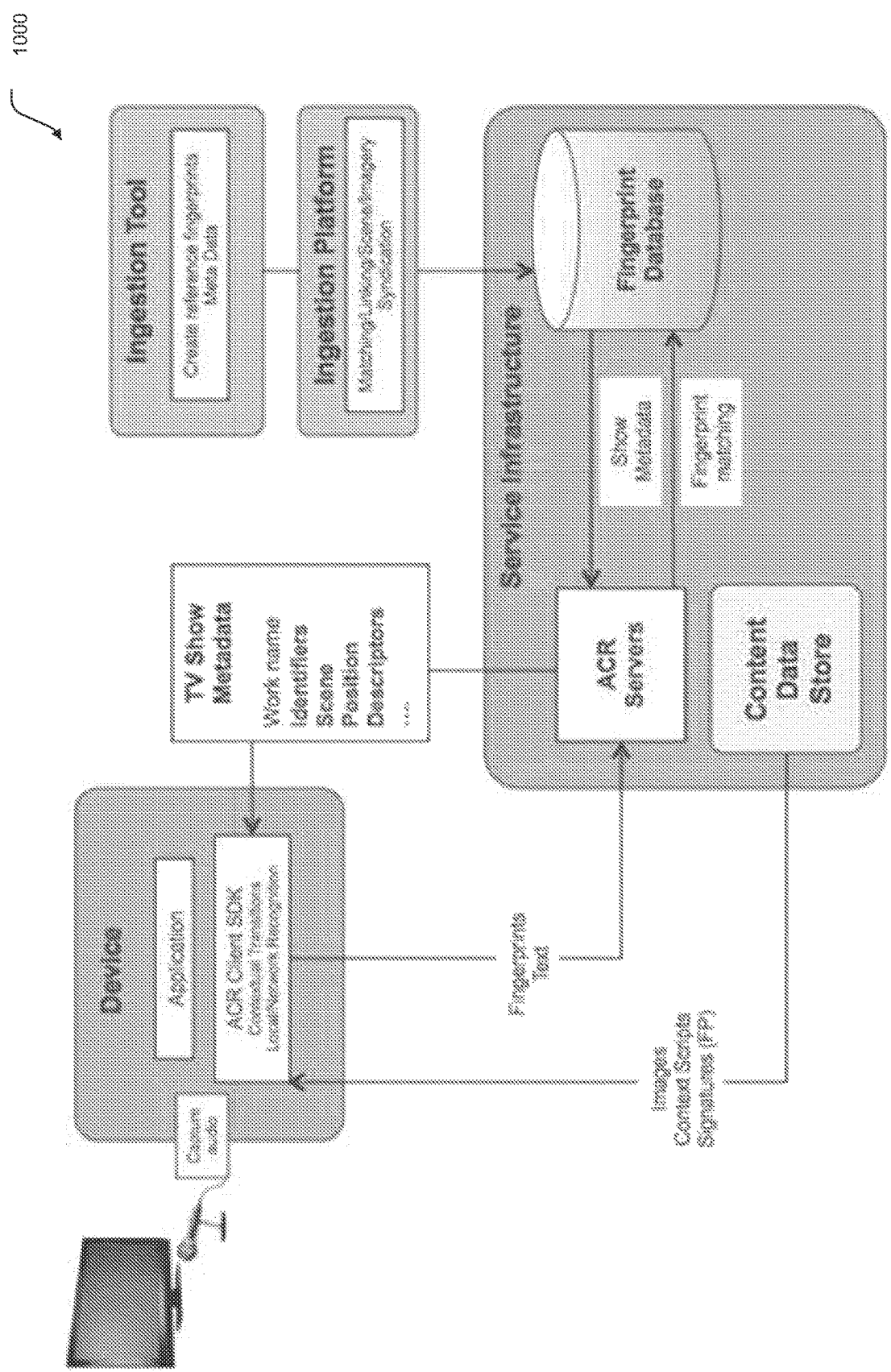
FIG. 10 illustrates operation using pre-recorded content (e.g., a prior broadcast), according to various embodiments of the invention.

For example, FIG. 10 illustrates operation of a system 1000 using pre-recorded content (e.g., a prior broadcast), according to various embodiments of the invention. Here the client device is shown using a microphone to capture audio from an audio source, such as a TV. The content recognition client operates to determine context and detect transitions using local and network recognition systems, to provide triggers to an application. The service infrastructure is used to support the client device, with servers, a data store, and a fingerprint database. An ingestion tool and ingestion platform can be used to populate the infrastructure with data, including fingerprints for matching. Meta-data, such as TV show metadata, may be provided by the infrastructure to the client device to enhance classification and transition detection, as well as to provide additional content for interaction with the user and the application in the device.

Figure 11:
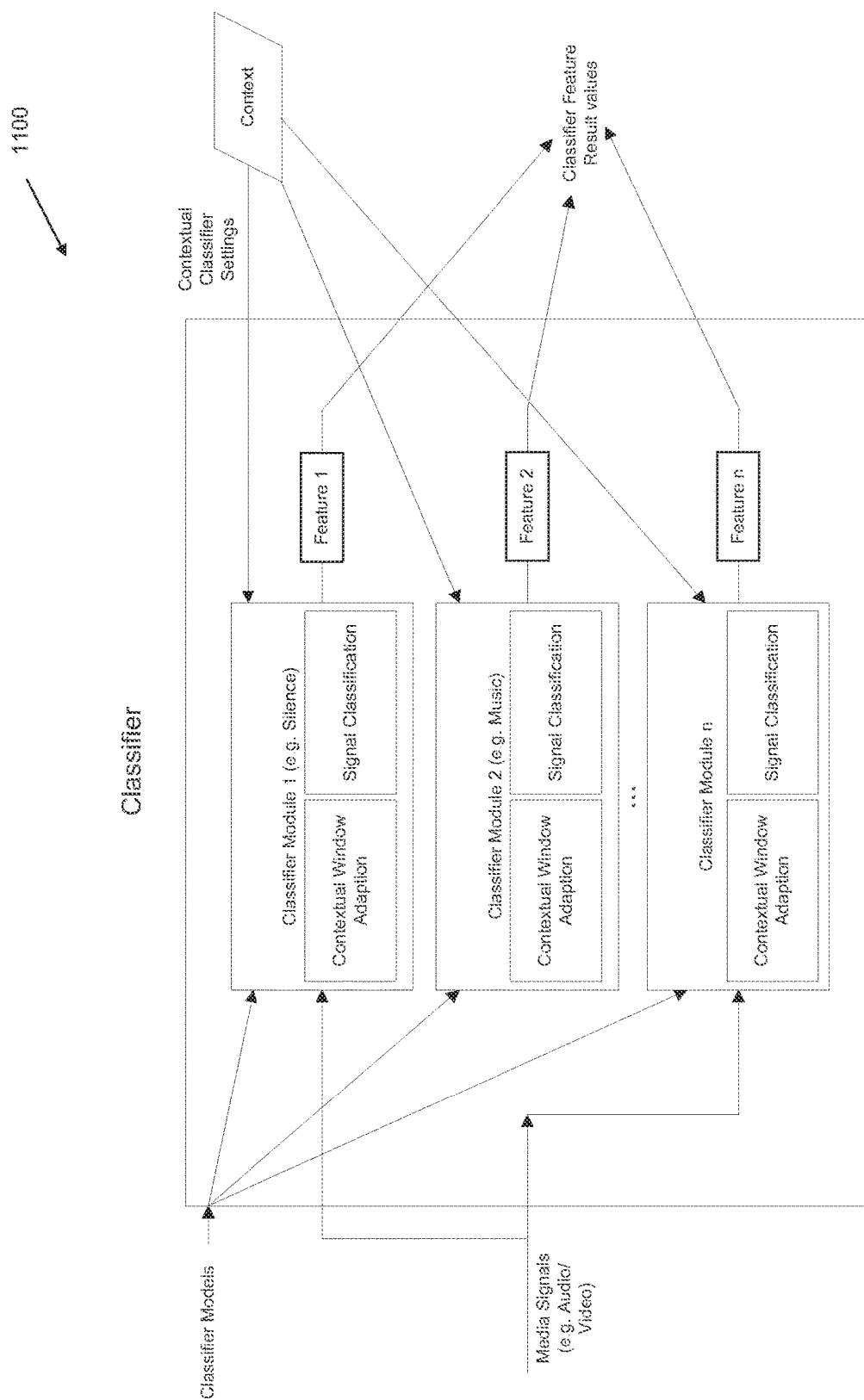
FIG. 11 is a block diagram of a classifier, with internal classifications being created over different time windows, according to various embodiments of the invention.

In another example, FIG. 11 is a block diagram of a classifier 1100, with internal classifications being created over different time windows, according to various embodiments of the invention. Here classifier modules 1, 2, . . . , n operate to accept classifier models, contextual setting, and media signals as input, to render classifier feature values as the resulting output. The classifier models may include threshold classification settings to identify signals associated with silence, noise, music, and applause, as are well-known to those of ordinary skill in the art. The contextual settings may operate to vary the model baseline settings, based on the context (e.g., shorter windows of observation for a scripted television show might give way to longer windows of observation for a live radio show). Media signals may comprise audio and/or video signals. The classifier 1100 may provide features with a rating from each of the modules, such as a value of 1000 for music, and a value of 6000 for applause, which would tend to indicate that applause is the most likely source of the current signal to the classifier.

Figure 12:
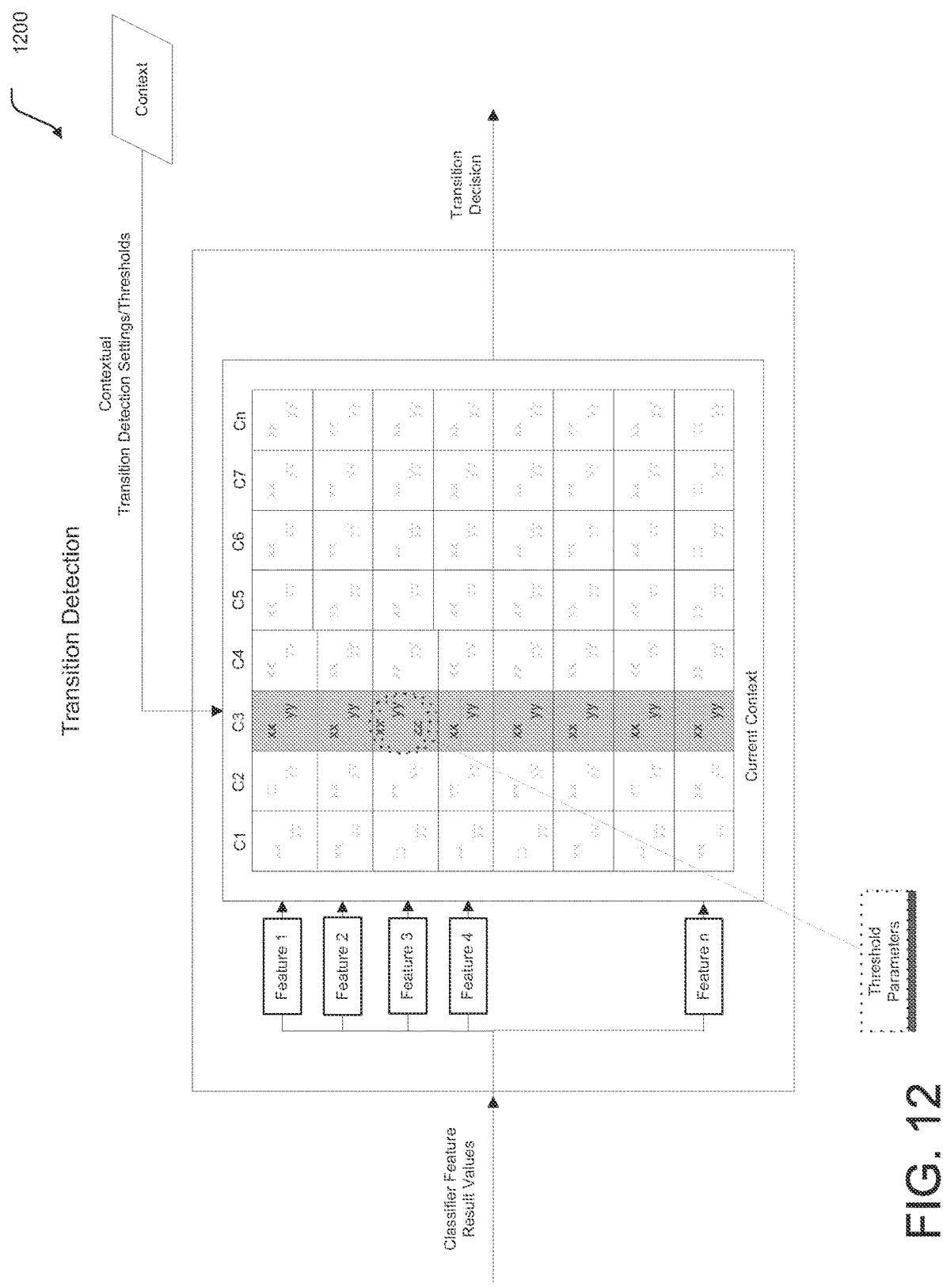
FIG. 12 is a block diagram of a transition engine that uses contextual classification to determine that a transition has occurred, according to various embodiments of the invention.

In a further example, FIG. 12 is a block diagram of a transition engine 1200 that uses contextual classification to determine that a transition has occurred, according to various embodiments of the invention. Here, one or more threshold parameters xx, yy, and/or zz are used to set thresholds for each feature (silence, talking, music, noise, laughter, clapping, etc.). The number of thresholds per feature is variable, perhaps based on the current context, so that transitions may, for example, be detected when a lower threshold is exceeded by the associated feature value, and an upper threshold has not yet been passed. Bands of thresholds may also be used for transition detection (e.g., two lower thresholds define one band, and two upper thresholds define another band, so that feature values that fall into one of the two bands indicate that a transition is detected, whereas other feature values indicate that no transition is detected).

Figure 13:
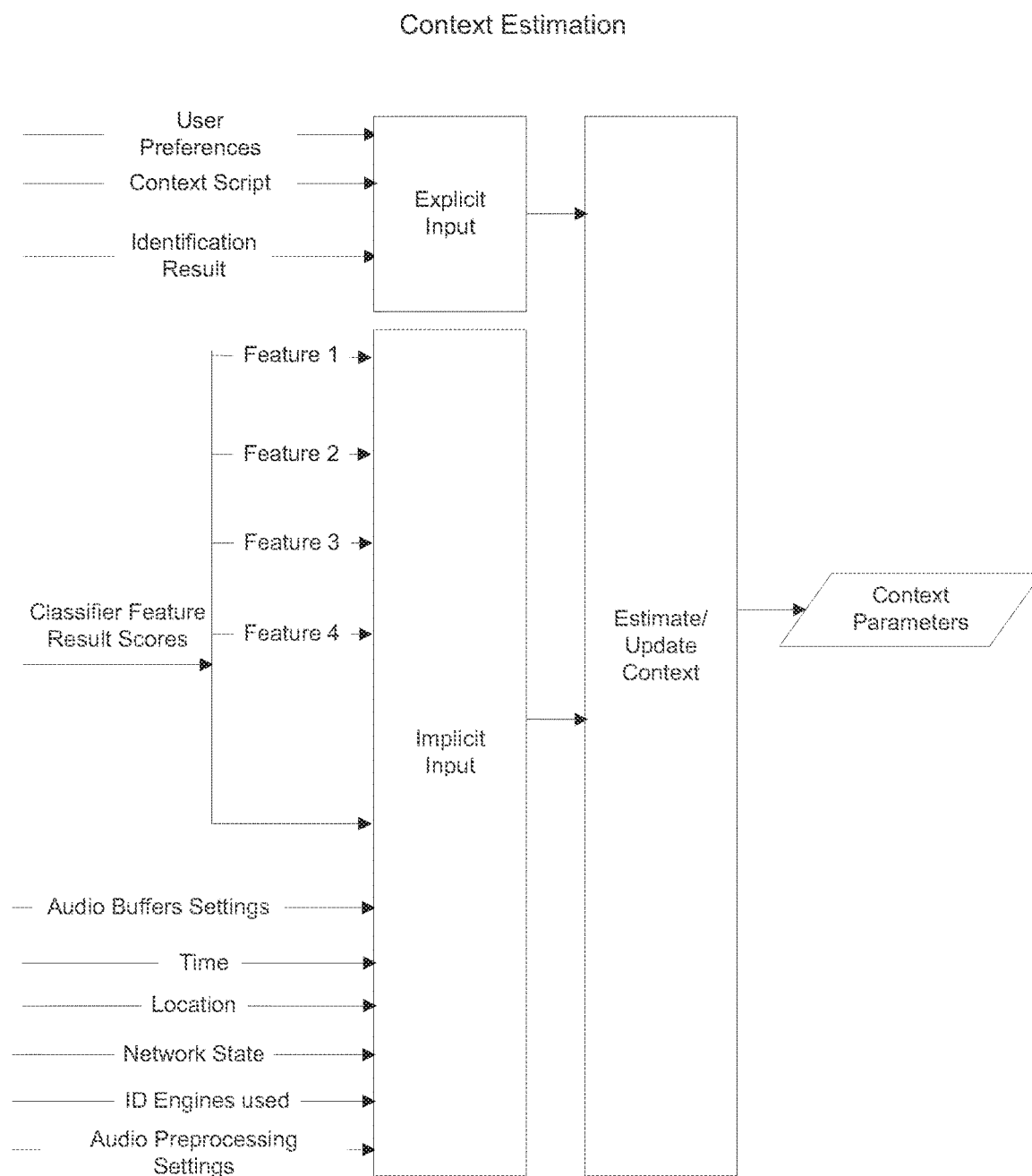
FIG. 13 is a block diagram of a context estimator that uses feature scores and other input to determine whether the context has changed, according to various embodiments of the invention.

In yet another example, FIG. 13 is a block diagram of a context estimator 1300 that uses feature scores and other input to determine whether the context has changed, according to various embodiments of the invention. When context changes occur, the context estimator uses implicit and explicit inputs to determine contextual values for the context identification, classifier, and transition detection.

Figure 14:
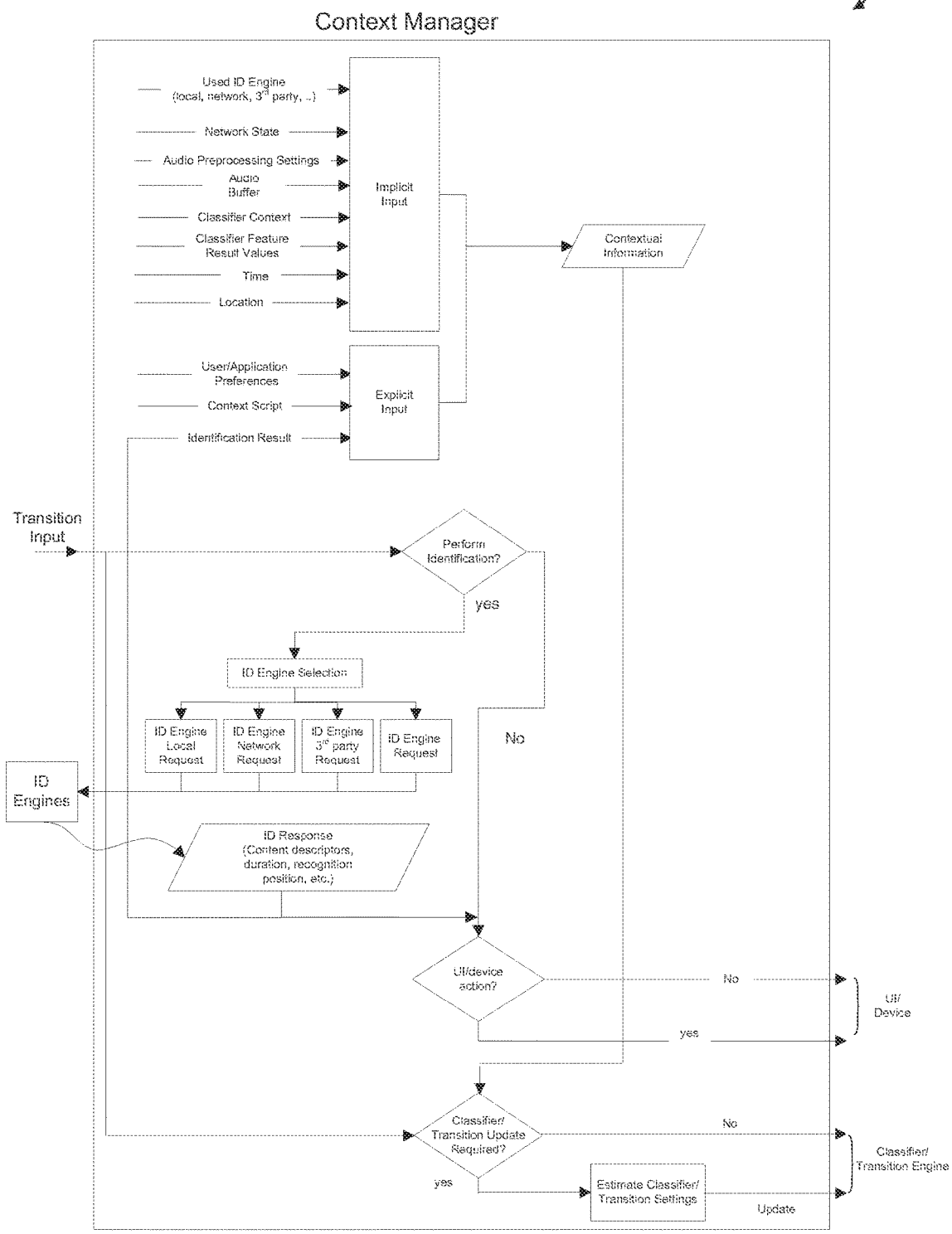
FIG. 14 is a block diagram of a context manager that uses transitions, classifications, context, and historical content to determine system activity, according to various embodiments of the invention.

In a final example, FIG. 14 is a block diagram of a context manager 1400 that uses transitions, classifications, context, and historical content to determine system activity, according to various embodiments of the invention. Thus, a variety of implicit and explicit context inputs are used to provide contextual information that determines whether the settings of the classifier should be changed, for example. When a transition occurs, as indicated at the transition input, identification engines (local or remote) may be used to identify the type of content that is currently present—or a previous identification of content may be maintained. Once the content is identified (or a prior identification is determined), user interface and/or device activity can be triggered, based on the type of content, and the type of transition detected. Other activities that can be triggered by the context manager include sending content updated transition and/or classifier setting information to the transition detector and/or the classifier. Any portion of any of the methods described herein can be executed on a networked node, such as a server, or on a mobile device, such as a cellular phone, or be divided between the networked node and the mobile device in various ways. Thus, numerous methods, apparatus, and systems may be realized. Some examples will now be described.

In some embodiments, a method may comprise continuously receiving an incoming audio and/or video signal; processing the signal to provide signal components; classifying the signal components to determine existence of threshold elements according to defined classes of events; detecting at least one transition by determining when the threshold elements have passed threshold values established by an environmental context associated with the signal; and upon detecting the at least one transition, adjusting the defined classes or the threshold values.

The processing may comprise equalizing the signal, based on the environmental context, to substantially eliminate selected bands of frequency. The processing may also comprise windowing the signal to limit a time period for the processing. The processing may also comprise thresholding the signal to reject amplitude components that exceed a defined level.

The signal components may comprise at least one of amplitude, frequency, pitch, tempo, or energy. These components can be extracted from the signal to determine their individual values.

The classes of events may comprise event classes used to classify signal components into threshold elements, and used to determine whether thresholds associated with the threshold elements have been met. The event classes may include one or more of: clapping, laughing, noise, talking, silence relative to thresholds associated with other features, relative peaks, presence of monotone, and time window length.

The threshold values may comprise at least one of a minimum threshold, a maximum threshold, and a historical average threshold to measure against selected ones of the signal components.

The environmental context may be selected from at least one of a car, a home, a store, a bar, or an undefined context.

The adjusting may further comprise adjusting both the classification of events and the thresholds, based on specific transitions being detected.

Upon detecting transitions, the method may comprise updating time position information associated with the incoming audio and/or video signal. Additional or alternative activity may comprise (upon detecting transitions) triggering a device action, such as a user interface presentation, based on a script associated with the environmental context.

In some embodiments, a method of determining an environmental context associated with a mobile device comprises recognizing transitions of interest within the context, associated with continuously streamed environmental audio signal content, and using the transitions to trigger selected behavior of the mobile device.

In some embodiments, a method of identifying the environmental context associated with a mobile device comprises dynamically configuring the mobile device for detecting transitions of interest as the context changes.

Some embodiments include a method of classifying environmental context changes assisted by meta-data returned from a network service. The method comprises determining an implicit context associated with a mobile device; determining a classification of an audio and/or video signal associated with the mobile device; and changing the classification in accordance with the implicit context.

Additional activities of the method may include determining previous content recognition, wherein the changing comprises changing the classification in accordance with the implicit context and the previous content recognition. Further activities may include determining a device operating mode, power supply type, and network connection type for the mobile device, wherein the changing comprises changing the classification in accordance with the implicit context and the device operating mode, power supply type, and network connection type.

Some embodiments include a method for synchronizing meta-data with content being displayed on a local or remote device, comprising revising selections of thresholds, fingerprint algorithms, and preferences, including cache size, based on current environmental context, recognized content, and/or environment type.

Some embodiments include a method of dynamically configuring fingerprint-based recognition, comprising using environmental classification output information derived from an incoming audio and/or video stream to select a fingerprint algorithm.

Some embodiments include a method of supporting large numbers of simultaneous identifications of audio and/or video content, comprising combining local content recognition and fingerprinting with network recognition; receiving locally-named information components by the network; and sending transition-generated triggers to a mobile device from the network, based on an environmental context associated with the mobile device.

Some embodiments include a method of signal separation based on detected environmental context transitions, comprising: using real time signal monitoring and fingerprinting in combination with the context transitions to separate television show content from commercial content in an audio and/or video signal.

Some embodiments include a method of providing classified sounds to an application, comprising processing an audio stream to extract and classify sounds to be provided to an application for one of recognition or triggering a response from the application.

Some embodiments include a method of linking computation devices, comprising receiving a personalized signal generated by a user input device; and linking the computation devices using the signal to share content and interactions, wherein the personalized signal is fingerprinted and used to group the computation devices using a time-limited grouping period.

Some embodiments include a method of detecting transitions in an audio signal to select a fingerprinting algorithm, comprising using a determined environmental context to select the fingerprinting algorithm.

Some embodiments include a method, comprising classifying an audio and/or video signal; detecting a transition in the signal; and fingerprinting content included in the signal to produce a reference fingerprint and to return at least meta-data and images associated with the reference fingerprint via a connected network and/or a local embedded reference repository.

Some embodiments include an apparatus, such as a mobile device, comprising at least a microphone to receive audio input as a signal that can be processed to determine transitions of interest, which are fed back to adjust the configuration of an audio and/or video signal classifier operating within the mobile device.

Some embodiments include an apparatus, such as a mobile device, comprising at least one of an optical or audio sensor that recognizes transitions of interest in content as they occur within a given environmental context, the mobile device configured to respond by displaying and/or playing related content.

Some embodiments include a networked node, comprising an input port to receive information from a mobile device; and a context manager to identify an environmental context associated with the mobile device, and to provide a list of transitions of interest which the mobile device is to subsequently monitor (listen for) and identify.

Some embodiments include a networked node, comprising an input port to receive processed signal information from a mobile device operating within an identified context; and a transition detector to identify a transition of interest associated with the information, and to provide a list of related content to the mobile device. The list can be displayed as a menu to the mobile device operator, for selection and delivery to the mobile device.

Some embodiments include a networked node, comprising an input port to receive an indication from a mobile device that a transition of interest has been identified; and a context manager to provide related content, or at least one location of related content, to the mobile device. Historic replay of the related content on the mobile device may be made available, and monitored, either by the node or the mobile device, or both.

Some embodiments include a context manager module operating within a networked node or a mobile device, to detect selected transitions of interest, based on a currently identified environmental context.

Some embodiments include a mobile device having extended battery life due to energy conservation when engaged in continuous digital audio recognition, comprising a module to use contextual classification, multiple identification engines, and metadata to determine time periods when reduced rates for classification requests can be implemented, to provide the extended battery life to the mobile device.

Some embodiments include a system realized as a network-assisted trainer using explicit and implicit context and classification, comprising a classification model server; a trend detection server coupled to the classification model server; and a context server coupled to the trend detection server.

When one or more of the embodiments described herein are implemented, several advantages may accrue. These include the ability to automatically and continuously synchronize to content based on audio or video input, to trigger application and user device activity. Advertising revenue may increase, while the consumer is provided with a more engaging experience.

Although the present subject matter has been described with reference to specific example embodiments, it will be evident that various modifications and changes may be made to these embodiments without departing from the broader scope of the subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," and so forth are used merely as labels and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. The Abstract is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus comprising:
  a classifier to determine an audio characteristic value representative of an audio characteristic in audio;
  a transition detector to detect a transition between a music category and a talk category by comparing the audio characteristic value to a threshold value among a set of threshold values, the set of threshold values corresponding to the music category and the talk category; and
  a context manager to control a device to initiate extraction of fingerprints, responsive to the detected transition between the music category and the talk category.

2. The apparatus of claim 1, wherein the transition detector is to detect the transition between the music category and the talk category by detecting an increase in the audio characteristic based on the comparing of the audio characteristic value to the threshold value.

3. The apparatus of claim 1, wherein the transition detector is to detect the transition between the music category and the talk category by detecting a decrease in the audio characteristic based on the comparing of the audio characteristic value to the threshold value.

4. The apparatus of claim 1, wherein the transition detector is to detect the transition between the music category and the talk category based on an increase in the audio characteristic value.

5. The apparatus of claim 1, wherein the transition detector is to detect the transition between the music category and the talk category based on a decrease in the audio characteristic value.

6. The apparatus of claim 1, wherein the context manager is to control the device based on the detected transition by selecting a fingerprinting algorithm responsive to the detected transition between the music category and the talk category.

7. The apparatus of claim 1, wherein the context manager is to control the device based on the detected transition by reducing a rate of audio classification requests in response to the detected transition between the music category and the talk category.

8. The apparatus of claim 1, wherein the context manager is to select the threshold value based on a context corresponding to the obtaining of the audio.

9. The apparatus of claim 1, wherein the context manager is to drop portions of the audio based on a context corresponding to the obtaining of the audio by:
   puncturing the audio over selected ranges of frequency; and
   detecting the transition in the punctured audio.

10. A non-transitory machine-readable storage medium comprising instructions that, when executed, cause one or more processors to at least:
   determine an audio characteristic in audio, the audio characteristic being represented by an audio characteristic value;
   detect a transition between a music category and a talk category by comparing the audio characteristic value to a threshold value among a set of threshold values, the set of threshold values corresponding to different categories in a set of categories including the music category and the talk category; and
   control a device to initiate extracting fingerprints responsive to the detected transition between the music category and the talk category.

11. The machine-readable storage medium of claim 10, wherein the instructions cause the one or more processors to detect the transition between the music category and the talk category by detecting an increase in the audio characteristic in the audio based on the comparing of the audio characteristic value to the threshold value.

12. The machine-readable storage medium of claim 10, wherein the instructions cause the one or more processors to detect the transition between the music category and the talk category by detecting a decrease in the audio characteristic in the audio based on the comparing of the audio characteristic value to the threshold value.

13. The machine-readable storage medium of claim 10, wherein the instructions cause the one or more processors to detect the transition between the music category and the talk category by identifying the transition based on an increase in the audio characteristic value.

14. The machine-readable storage medium of claim 10, wherein the instructions cause the one or more processors to detect the transition between the music category and the talk category by identifying the transition based on a decrease in the audio characteristic value.

15. The machine-readable storage medium of claim 10, wherein the instructions cause the one or more processors to control the device based on the detected transition by selecting a fingerprinting algorithm responsive to the detected transition between the music category and the talk category.

16. The machine-readable storage medium of claim 10, wherein the instructions cause the one or more processors to control the device based on the detected transition by reducing a rate of audio classification requests in response to the detected transition between the music category and the talk category.

17. The machine-readable storage medium of claim 10, wherein the instructions cause the one or more processors to select the threshold value based on a context corresponding to the obtaining of the audio.

18. The machine-readable storage medium of claim 10, wherein the instructions cause the one or more processors to drop portions of the audio based on a context corresponding to the obtaining of the audio by:
   puncturing the audio over selected ranges of frequency; and
   detecting the transition in the punctured audio.

19. A method comprising:
   determining, by executing an instruction with one or more processors, an audio characteristic in audio, the audio characteristic being represented by an audio characteristic value;
   detecting, by executing an instruction with the one or more processors, a transition between a music category and a talk category by comparing the audio characteristic value to a threshold value among a set of threshold values, the set of threshold values corresponding to different categories in a set of categories including the music category and the talk category; and
   controlling, by executing an instruction with the one or more processors, a device to initiate extracting fingerprints responsive to the detected transition between the music category and the talk category.

20. The method of claim 19, wherein the detecting of the transition between the music category and the talk category includes detecting an increase in the audio characteristic in the audio based on the comparing of the audio characteristic value to the threshold value.

* * * * *